United States Patent
Liu et al.

(10) Patent No.: US 7,327,124 B2
(45) Date of Patent: Feb. 5, 2008

(54) CONTROL APPARATUS AND METHOD FOR A BOOST-INVERTING CONVERTER

(75) Inventors: Jing-Meng Liu, Hsinchu (TW);
Chung-Lung Pai, Hsinchu (TW);
Hung-Der Su, Luju Township,
Kaohsiung County (TW); Wei-Hsin Wei, Wufong Township, Taichung County (TW)

(73) Assignee: Richtek Technology Corp., Hsinchu (TW)

(*) Notice: Subject to any disclaimer, the term of this patent is extended or adjusted under 35 U.S.C. 154(b) by 130 days.

(21) Appl. No.: 11/388,158

(22) Filed: Mar. 24, 2006

(65) Prior Publication Data
US 2006/0214648 A1 Sep. 28, 2006

(30) Foreign Application Priority Data
Mar. 28, 2005 (TW) .............................. 94109629 A

(51) Int. Cl.
*G05F 1/577* (2006.01)
(52) U.S. Cl. ..................... 323/267; 323/283; 323/284
(58) Field of Classification Search ................ 323/266, 323/267, 271, 283, 284
See application file for complete search history.

(56) References Cited

U.S. PATENT DOCUMENTS

| 6,437,545 | B2* | 8/2002 | Sluijs ......................... 323/222 |
| 6,600,300 | B2* | 7/2003 | Groeneveld et al. ........ 323/282 |
| 6,636,022 | B2* | 10/2003 | Sluijs ......................... 323/222 |
| 6,946,820 | B2* | 9/2005 | Ishii et al. ................... 323/222 |
| 2002/0093315 | A1* | 7/2002 | Sluijs ......................... 323/267 |
| 2004/0027104 | A1* | 2/2004 | Ishii et al. ................... 323/267 |

* cited by examiner

*Primary Examiner*—Jeffrey Sterrett
(74) *Attorney, Agent, or Firm*—Rosenberg, Klein & Lee

(57) ABSTRACT

A plurality of switches, an inductor and two capacitors are configured to be a boost-inverting converter. To operate the converter in a boost-inverting mode, a control apparatus and method switch the switches such that the inductor is energized in a first phase, the first capacitor is discharged to produce an inverting voltage in a second phase, and the capacitor Cout1 is discharged to produce the inverting voltage and the second capacitor is charged to produce a boost voltage in a third phase. Therefore, the boost-inverting converter has lower peak inductor current and less power loss, and the limitation to the switch design for the boost-inverting converter is relaxed.

70 Claims, 23 Drawing Sheets

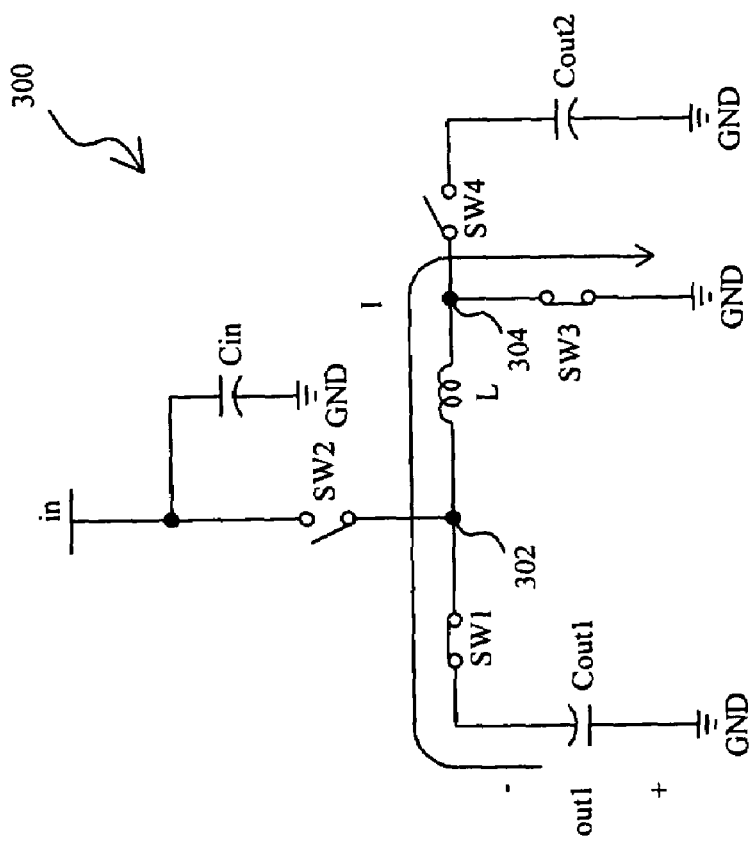
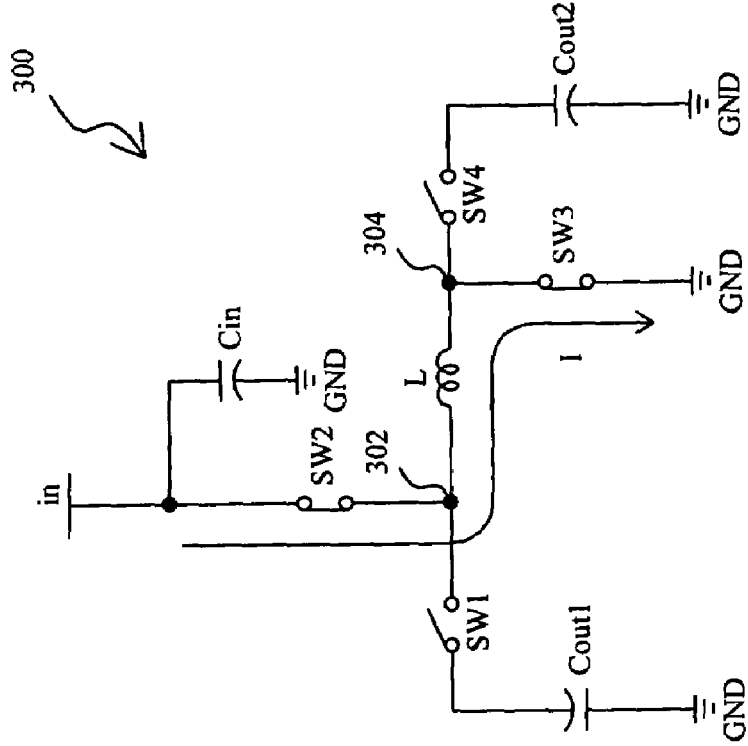
Fig. 3B
Prior Art
Fig. 3A

CONTROL APPARATUS AND METHOD FOR A BOOST-INVERTING CONVERTER

FIELD OF THE INVENTION

The present invention is related generally to a boost-inverting converter and, more particularly, to a control apparatus and method for a boost-inverting converter.

BACKGROUND OF THE INVENTION

Recently, a type of power converter, called boost-inverting converter, which combines the boost converter function and the inverting converter function together, has been applied in LCD (Liquid Crystal Display) and CCD (Charge Coupled Device) image devices. For further discussion, an exemplary circuit of a conventional inverting converter 100 is shown in FIGS. 1A and 1B. In the inverting converter 100, a switch SW1 is connected between a capacitor Cout and a node 102, a switch SW2 is connected between an input Vin and the node 102, and an inductor L is connected between the node 102 and ground GND. In the first phase, as shown in FIG. 1A, the switch SW1 turns off and the switch SW2 turns on, and therefore an inductor current I flows from the input Vin to ground GND through the switch SW2 and inductor L, by which the inductor L is energized. After switching to the second phase, as shown in FIG. 1B, the switch SW1 turns on and the switch SW2 turns off, and therefore the inductor L releases the energy stored thereof and the inductor current I becomes to flow from the capacitor Cout to ground GND through the switch SW1 and inductor L. As such, the capacitor Cout is discharged and an inverting voltage Vout1 is produced thereon. On the other hand, a conventional boost converter 200 is shown in FIGS. 2A and 2B, in which an inductor L is connected between an input Vin and a node 202, a switch SW1 is connected between the node 202 and a capacitor Cout, and a switch SW2 is connected between the node 202 and ground GND. In the first phase, as shown in FIG. 2A, the switch SW1 turns off and the switch SW2 turns on, such that an inductor current I flows from the input Vin to ground GND through the inductor L and switch SW2 to energize the inductor L. After switching to the second phase, as shown in FIG. 2B, the switch SW1 turns on and the switch SW2 turns off, and therefore the inductor L releases the energy stored thereof and the inductor current I becomes to flow from the input Vin to the capacitor Cout through the inductor L and switch SW1. As a result, the capacitor Cout is charged and a boost voltage Vout2 is produced thereon. By combining the inverting converter 100 and boost converter 200, as shown in FIGS. 3A to 3C, a conventional boost-inverting converter 300 comprises a switch SW1 connected between a capacitor Cout1 and a node 302, a switch SW2 connected between an input Vin and the node 302, an inductor L connected between the node 302 and a node 304, a switch SW3 connected between the node 304 and ground GND, and a switch SW4 connected between the node 304 and a capacitor Cout2. When the boost-inverting converter 300 operates in an inverting mode, as shown in FIG. 3A for the first phase, the switches SW1 and SW4 turn off and the switches SW2 and SW3 turn on, such that the inductor L is energized by an inductor current I flowing from the input Vin to ground GND through the switch SW2, inductor L and switch SW3. Then the boost-inverting converter 300 is switched from the first phase to the second phase as shown in FIG. 3B, the switches SW1 and SW3 turn on and the switches SW2 and SW4 turn off, and therefore the inductor L releases the energy stored thereof and the inductor current I becomes to flow from the capacitor Cout1 to ground GND through the switch SW1, inductor L and switch SW3, by which the capacitor Cout1 is discharged and an inverting voltage Vout1 is produced thereon. If the boost-inverting converter 300 is to be operated in a boost mode, the inductor L is also energized in the first phase shown in FIG. 3A. However, the boost-inverting converter 300 is then switched from the first phase to the third phase as shown in FIG. 3C, by which the switches SW1 and SW3 turn off and the switches SW2 and SW4 turn on, and therefore the inductor L releases the energy stored thereof and the inductor current I becomes to flow from the input Vin to the capacitor C out2 through the switch SW2, inductor L and switch SW4. Therefore, the capacitor Cout2 is charged and a boost voltage Vout2 is produced thereon.

The boost-inverting converter 300 may excellently operate in single mode, either the inverting mode or the boost mode. Nevertheless, it may not be normally operated in a continuous mode, i.e., switched between the inverting mode and boost mode. If it is switched from one mode to another before the inductor L completely releases the energy stored thereof, error operation will occur in the later mode. For this reason, the boost-inverting converter 300 is always operated either in a pure inverting mode or in a pure boost mode, but never a continuous mode. Furthermore, for both the inverting mode and boost mode to be normally operated, the boost-inverting converter 300 is required to allow for a higher peak inductor current than the inverting converter 100 and boost converter 200. To satisfy such requirement, the switches it employs have more difficult device design and are more expensive, and the power loss when it is operated is greater.

Therefore, it is desired a control apparatus and method to operate a boost-inverting converter in a continuous mode and to allow the boost-inverting converter to have a lower peak inductor current.

SUMMARY OF THE INVENTION

An object of the present invention is to provide a control apparatus and method capable of operating a boost-inverting converter in a continuous mode.

Another object of the present invention is to provide a control apparatus and method that allow a boost-inverting converter to have a lower peak inductor current.

Yet another object of the present invention is to provide a control apparatus and method that may operate a boost-inverting converter in a boost mode, inverting mode and boost-inverting mode.

In a boost-inverting converter, at least two switches, an inductor and two capacitors are so configured that by switching the switches, the inductor will be energized in a first phase, the first capacitor will be discharged to produce a first output voltage in a second phase, and the second capacitor will be charged to produce a second output voltage in a third phase. To operate the boost-inverting converter, according to the present invention, a control apparatus comprises a first error amplifier to produce a first signal by amplifying a first difference between a first reference signal and a first feedback signal varying with the first output voltage, a second error amplifier to produce a second signal by amplifying a second difference between a second reference signal and a second feedback signal varying with the second output voltage, a combiner to produce a third signal by combining the first signal multiplied with a first parameter and the second signal multiplied with a second parameter, a waveform generator to produce a fourth signal, a first comparator to produce a first control signal by comparing the first signal with the fourth signal, a second comparator to produce a second control signal by comparing the second signal with the fourth signal, a third comparator to produce a third control signal by comparing the third signal with the fourth signal, and a logical circuit to produce a plurality of drive signals based on the three control signals for switching the switches. The first and second parameters have a sum equal to one.

When operating in a boost-inverting mode, the switches are so switched that the inductor is energized in a first phase, the inductor is relaxed and the first capacitor is discharged to produce an inverting voltage in a second phase, the first capacitor is discharged and the second capacitor is charged to produce a boost voltage in a third phase, and the first capacitor is discharged and the second capacitor stops being charged in a fourth phase.

Alternatively, when operating in a boost-inverting mode, the switches are so switched that the inductor is energized in a first phase, the inductor is relaxed and the second capacitor is charged to produce a boost voltage in a second phase, the second capacitor is charged and the first capacitor is discharged to produce an inverting voltage in a third phase, and the second capacitor is charged and the first capacitor stops being discharged in a fourth phase.

According to the present invention, a boost-inverting converter may be operated in an inverting mode, boost mode and boost-inverting mode. Namely, the boost-inverting converter may be normally operated in a continuous mode. Therefore, the peak inductor current is reduced, the switches is easier to design, and the power loss is less.

BRIEF DESCRIPTION OF THE DRAWINGS

The present invention can be more fully understood by reading the subsequent detailed description and examples with references made to the accompanying drawings; wherein:

FIG. 3A shows a conventional boost-inverting converter when the inductor thereof is energized;

FIG. 3B shows how the boost-inverting converter of FIG. 3A produces an inverting voltage;

DETAILED DESCRIPTION OF THE INVENTION

1. First Embodiment

Synchronous-Boost-Synchronous-Inverting Converter

Figure 4A:
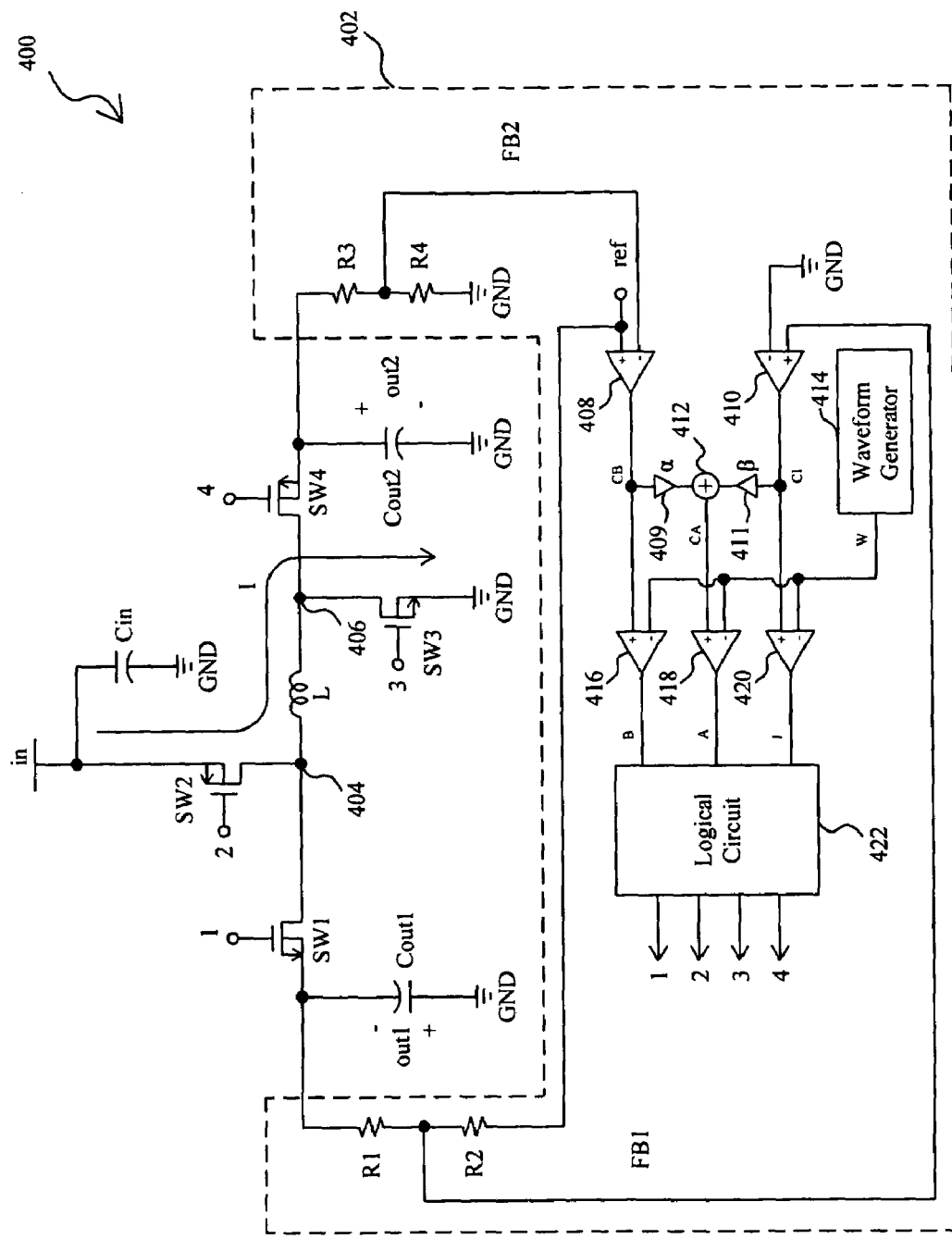
FIGS. 4A to 4C show a synchronous-boost-synchronous-inverting converter 400 operating in a boost-inverting mode.
Figure 4B:
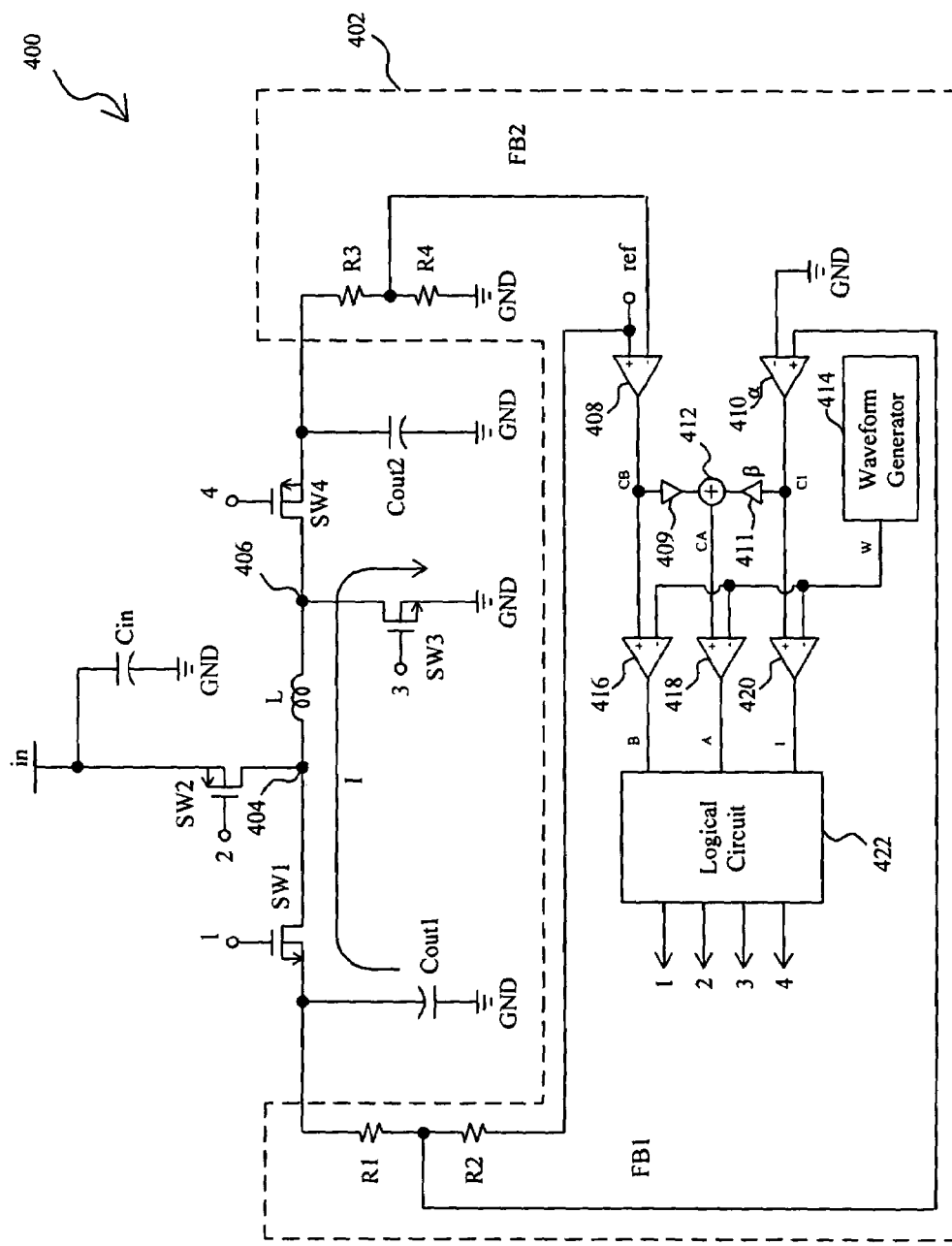
Figure 4C:
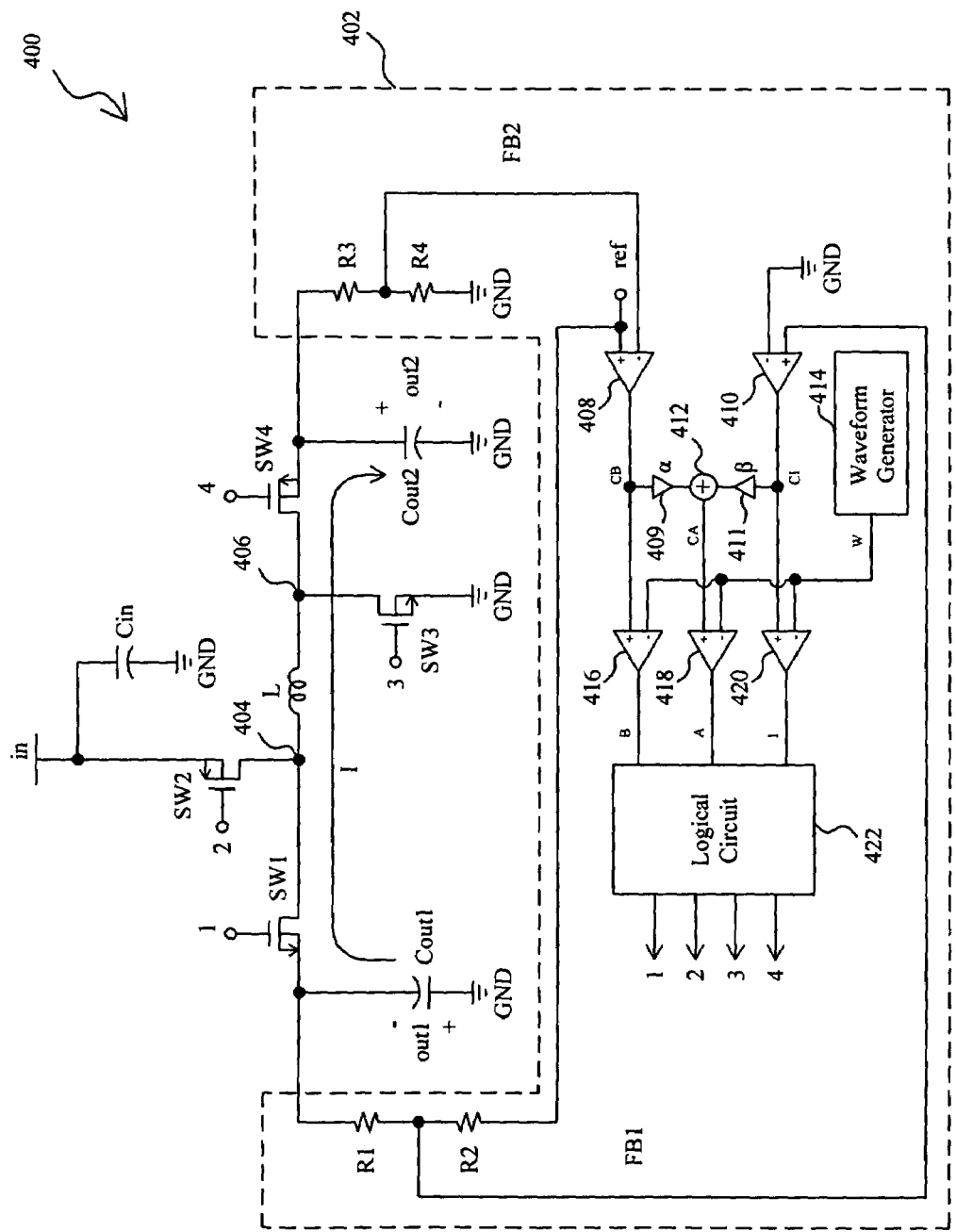

FIGS. 4A to 4C show a synchronous-boost-synchronous-inverting converter 400 operating in a boost-inverting mode, in which a switch SW1 is connected between a capacitor Cout1 and a node 404, a switch SW2 is connected between the node 404 and an input connected with a supply voltage Vin, an inductor L is connected between the node 404 and a node 406, a switch SW3 is connected between the node 406 and an input connected to ground GND, a switch SW4 is connected between the node 406 and a capacitor Cout2, and a control apparatus 402 produces four drive signals V1, V2, V3 and V4 for switching the four switches SW1, SW2, SW3 and SW4, respectively, in order to produce an inverting voltage Vout1 on the capacitor Cout1 and a boost voltage Vout2 on the capacitor Cout2 and determines the maximum duty cycle of each switch SW1, SW2, SW3 and SW4. In the control apparatus 402, two resistors R1 and R2 are connected in series between the output Vout1 and a reference signal Vref as a voltage divider to divide the inverting voltage Vout1 to produce a feedback signal VFB1 proportional to the inverting voltage Vout1, and two resistors R3 and R4 are connected in series between the output Vout2 and ground GND as a voltage divider to divide the boost voltage Vout2 to produce a feedback signal VFB2 proportional to the boost voltage Vout2. An error amplifier 408 produces an error signal $V_{CB}$ by amplifying the difference between the feedback signal VFB2 and reference signal Vref for a comparator 416 to compare with a signal $V_W$ generated by a waveform generator 414 to produce a control signal $V_B$. Similarly, an error amplifier 410 produces an error signal $V_{CI}$ by amplifying the difference between the feedback signal VFB1 and a zero threshold for a comparator 420 to compare with the signal $V_W$ to produce a control signal $V_I$. In addition, the error signal $V_{CB}$ is multiplied by a multiplier 409 with a parameter α, the error signal $V_{CI}$ is multiplied by a multiplier 411 with a parameter β, and a combiner 412 combines these two products to produce a signal $V_{CA}$ for a comparator 418 to compare with the signal $V_W$ to produce a control signal $V_A$. In this embodiment, the parameters α and β have a sum equal to one. Based on the control signals $V_B$, $V_A$ and $V_I$, a logical circuit 422 produces the four drive signals V1, V2, V3 and V4 to switch the four switches SW1, SW2, SW3 and SW4, respectively. Actually, there may be offsets in the error signals $V_{CB}$ and $V_{CI}$ for some reasons, for example the presence or absence of load to the converter 400, and which will cause the inductor L not sufficiently energized. Therefore, the signal $V_{CA}$ in this embodiment is so produced from the error signals $V_{CB}$ and $V_{CI}$ with the multiplications of the parameters α and β to ensure that the inductor L will be sufficiently energized.

Figure 5:
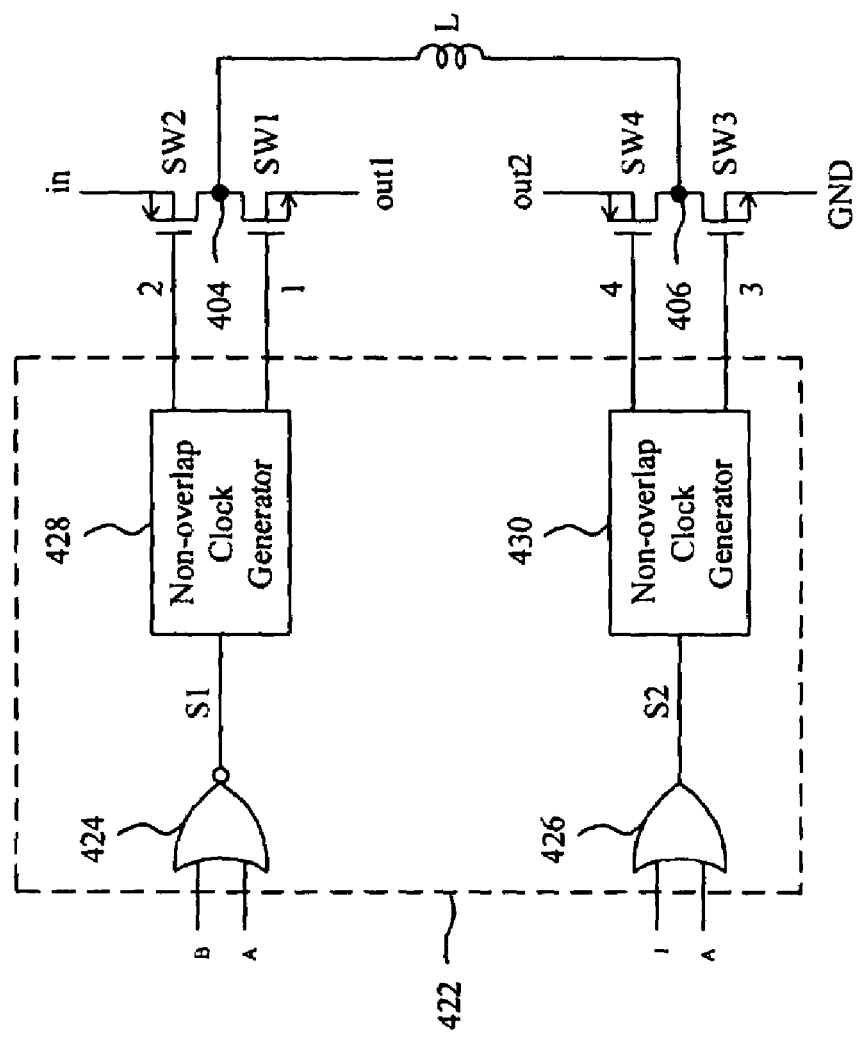
FIG. 5 shows an embodiment for the logical circuit of the converter shown in FIG. 4.

FIG. 5 shows an embodiment for the logical circuit 422 of the converter 400, in which a NOR gate 424 produces a signal S1 in response to the control signals $V_A$ and $V_B$ for a non-overlap clock generator 428 to produce the drive signals V1 and V2 for switching the switches SW1 and SW2, and an OR gate 426 produces a signal S2 in response to the control signals $V_A$ and $V_I$ for a non-overlap clock generator 430 to produce the drive signals V3 and V4 for switching the switches SW3 and SW4. By use of the non-overlap clock generators 428 and 430, the duty cycles of the drive signals V1 and V2 are prevented from overlapping with each other, i.e., the switches SW1 and SW2 will not turn on simultaneously, and the duty cycles of the drive signals V3 and V4 are prevented from overlapping with each other, i.e., the switches SW3 and SW4 will not turn on simultaneously.

Figure 6:
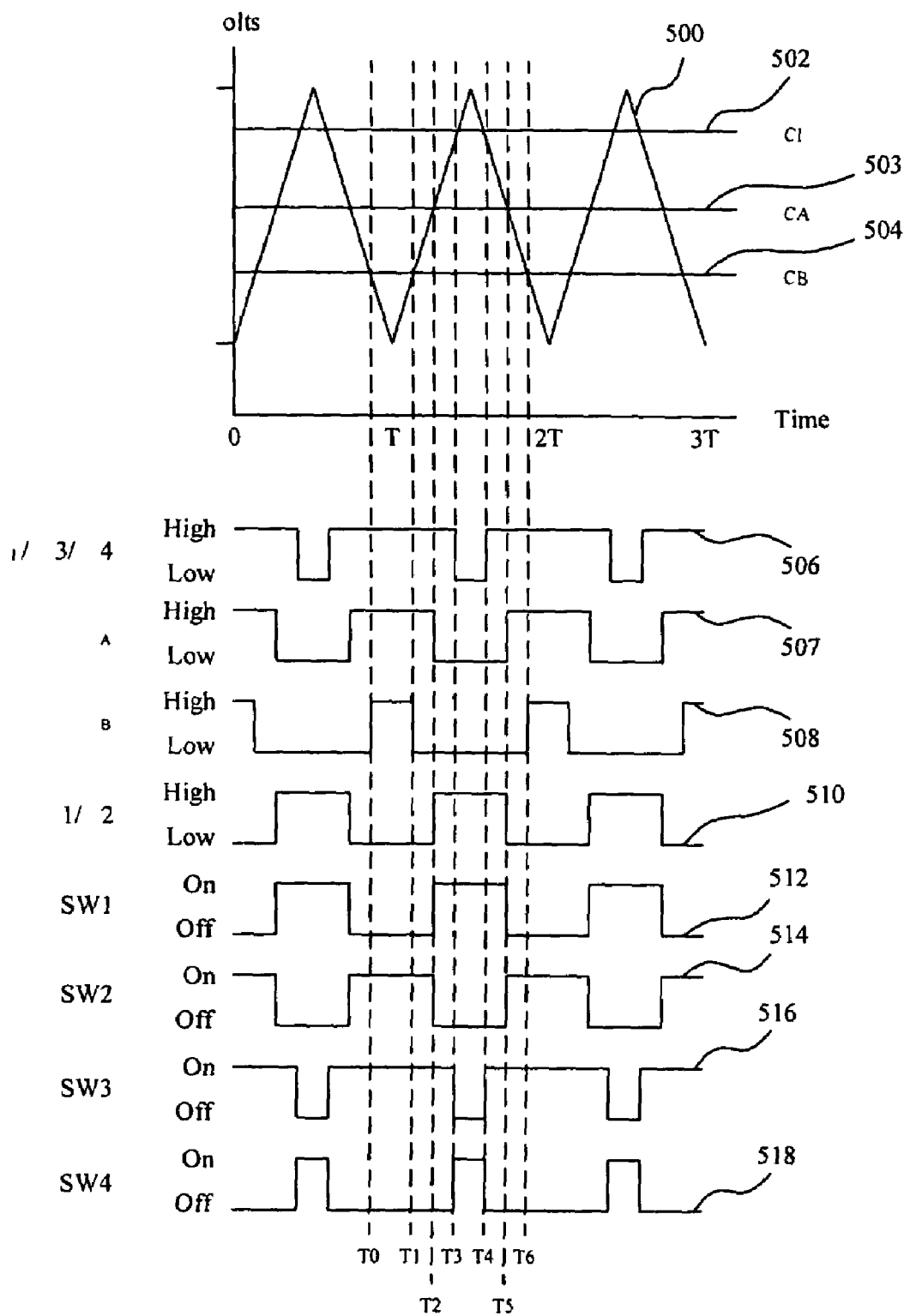
FIG. 6 is a timing diagram of various signals in the converter of FIG. 4 when operating in a boost-inverting mode.

FIG. 6 is a timing diagram of various signals in the converter 400 when operating in a boost-inverting mode, in which waveform 500 represents the signal $V_W$, waveform 502 represents the error signal $V_{CI}$, waveform 503 represents the signal $V_{CA}$, waveform 504 represents the error signal $V_{CB}$, waveform 506 represents the control signal $V_I$ and the drive signals V3 and V4, waveform 507 represents the control signal $V_A$, waveform 508 represents the control signal $V_B$, waveform 510 represents the drive signals V1 and V2, waveform 512 represents the switching of the switch SW1, waveform 514 represents the switching of the switch SW2, waveform 516 represents the switching of the switch SW3, and waveform 518 represents the switching of the switch SW4. In this embodiment, the switches SW1 and SW3 are NMOSes and the switches SW2 and SW4 are PMOSes; therefore, the drive signals V1 and V2 have the same phase and the drive signals V3 and V4 have the same phase. In other embodiments, it may not be the case, e.g., the drive signals V1 and V2 are inverse to each other in phase and the drive signals V3 and V4 are inverse to each other in phase, if the switches SW1, SW2, SW3 and SW4 are different types of MOSes from those in this embodiment.

With reference to FIGS. 4A, 5 and 6, during the period of time T0 to time T1, since the signal $V_W$ provided by the waveform generator 414 is lower than each of the error signals $V_{CI}$, $V_{CB}$ and $V_{CA}$, the control signals $V_I$, $V_B$ and $V_A$ are all at high level, resulting in the drive signals V1 and V2 at low level and the drive signals V3 and V4 at high level, and by which the switches SW1 and SW4 turn off and the switches SW2 and SW3 turn on. Accordingly, as shown in FIG. 4A, the current I flows from the input Vin to ground GND through the switch SW2, inductor L and switch SW3, by which the inductor L is energized. In the period between time T1 and time T2, the signal $V_W$ raises up to the level between those of the error signals $V_{CB}$ and $V_{CA}$, and therefore, the control signals $V_I$ and $V_A$ are still at high level while the control signal $V_B$ is at low level. Due to the control signal $V_A$ at high level, the switches SW1 and SW4 still turn off and the switches SW2 and SW3 still turn on, so that the inductor L is still energized.

With reference to FIGS. 4B, 5 and 6, when the converter 400 operates in the period between time T2 and time T3, the signal $V_W$ is higher than the error signals $V_{CB}$ and $V_{CA}$, but still lower than the error signal $V_{CI}$. Hence, the control signal $V_I$ is at high level and the control signals $V_B$ and $V_A$ are at low level. Accordingly, the drive signals V1, V2, V3 and V4 are all at high level, and the switches SW1 and SW3 turn on while the switches SW2 and SW4 turn off. As shown in FIG. 4B, due to the released energy from the inductor L, the current I flows from the capacitor Cout1 to ground GND through the switch SW1, inductor L and switch SW3, and the capacitor Cout1 is discharged to produce the inverting voltage Vout1.

With reference to FIGS. 4C, 5 and 6, in the period between time T3 and time T4, the signal $V_W$ is higher than each of the error signals $V_{CB}$, $V_{CI}$ and $V_{CA}$, and thereby the control signals $V_B$, $V_I$ and $V_A$ are all at low level. Hence, the drive signals V1 and V2 are at high level and the drive signals V3 and V4 are at low level. Accordingly, the switches SW1 and SW4 turn on and the switches SW2 and SW3 turn off. As a result, as shown in FIG. 4C, the current I flows from the capacitor Cout1 to the capacitor Cout2 through the switch SW1, inductor L and switch SW4, and thereby the capacitor Cout1 is discharged to produce the inverting voltage Vout1 and the capacitor Cout2 is charged to produce the boost voltage Vout2. When the current I is less than zero, the switches SW1 and SW4 turn off immediately.

With reference to FIGS. 4B, 5 and 6 again, when the converter 400 operates in the period from time T4 to time T5, the signal $V_W$ is higher than the error signals $V_{CB}$ and $V_{CA}$, but lower than the error signal $V_{CI}$, and hence the control signal $V_I$ is at high level and the control signals $V_B$ and $V_A$ are at low level, resulting in the drive signals V1, V2, V3 and V4 all at high level. Accordingly, the switches SW1 and SW3 turn on and the switches SW2 and SW4 turn off, thereby the current I flowing from the capacitor Cout1 to ground GND through the switch SW1, inductor L and switch SW3 again, as shown in FIG. 4B, and the capacitor Cout1 is discharged.

Referring back to FIGS. 4A, 5 and 6, in the period between time T5 and time T6, the signal $V_W$ is lower than the error signals $V_{CI}$ and $V_{CA}$, but higher than the error signal $V_{CB}$. Thus, the control signals $V_I$ and $V_A$ are at high level and the control signal $V_B$ is at low level, and therefore, the drive signals V1 and V2 are at low level and the drive signals V3 and V4 are at high level. Accordingly, the switches SW1 and SW4 turn off and the switches SW2 and SW3 turn on, resulting in the current I flowing from the input Vin to ground GND through the switch SW2, inductor L and switch SW3, as shown in FIG. 4A, and the inductor L is energized again.

2. Second Embodiment

Synchronous-Boost-Asynchronous-Inverting Converter

Figure 7A:
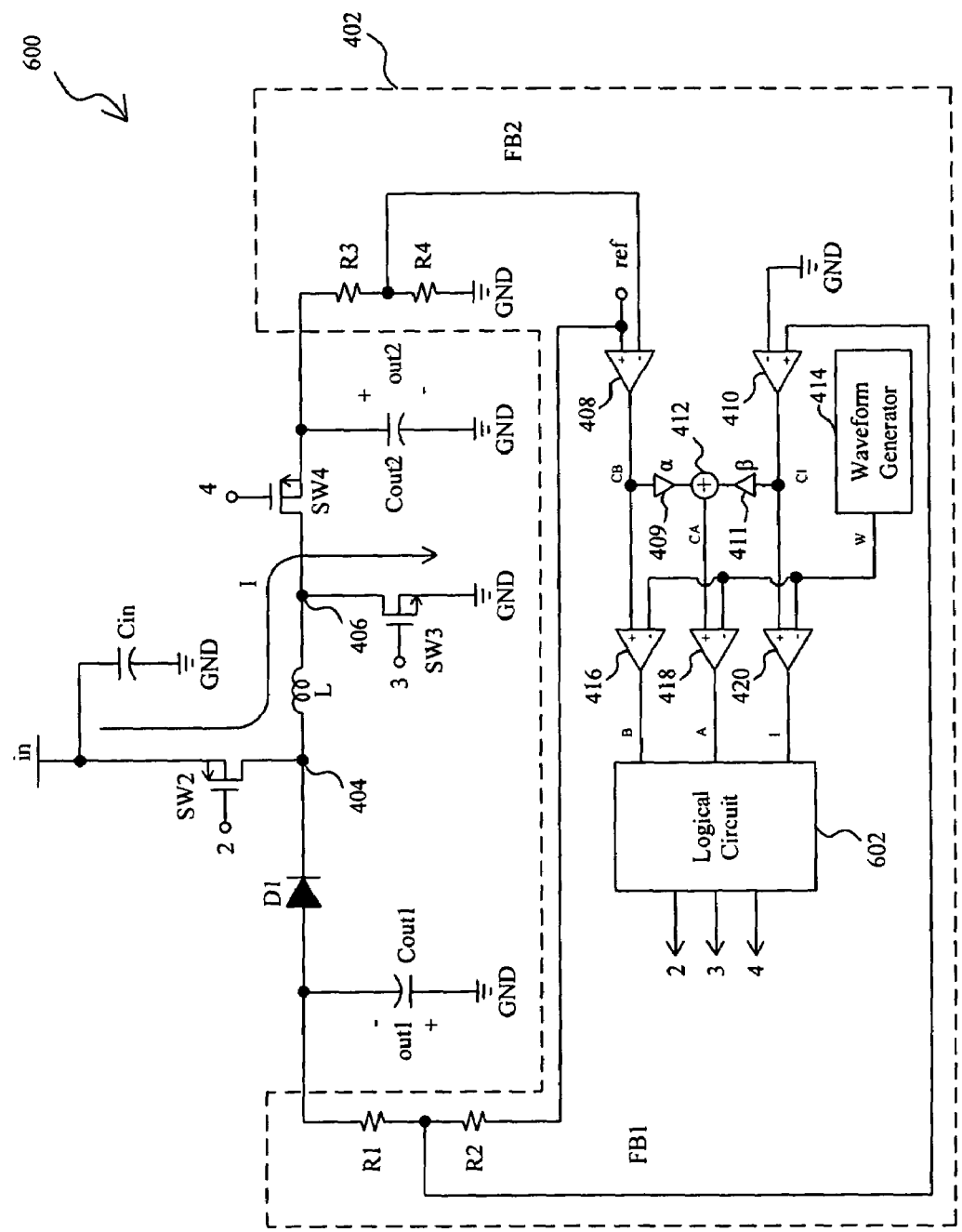
FIGS. 7A to 7C show a synchronous-boost-asynchronous-inverting converter operating in a boost-inverting mode.
Figure 7B:
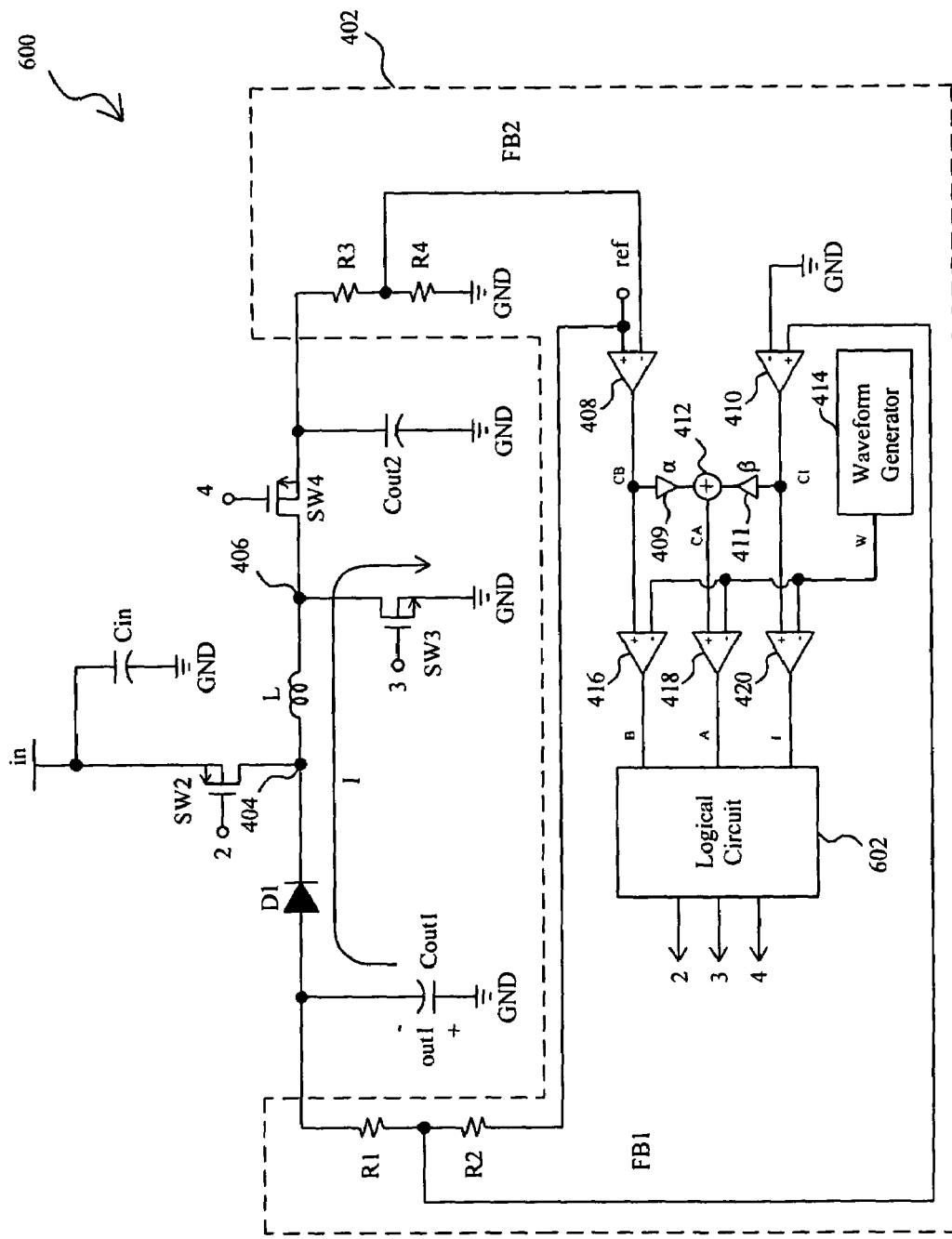
Figure 7C:
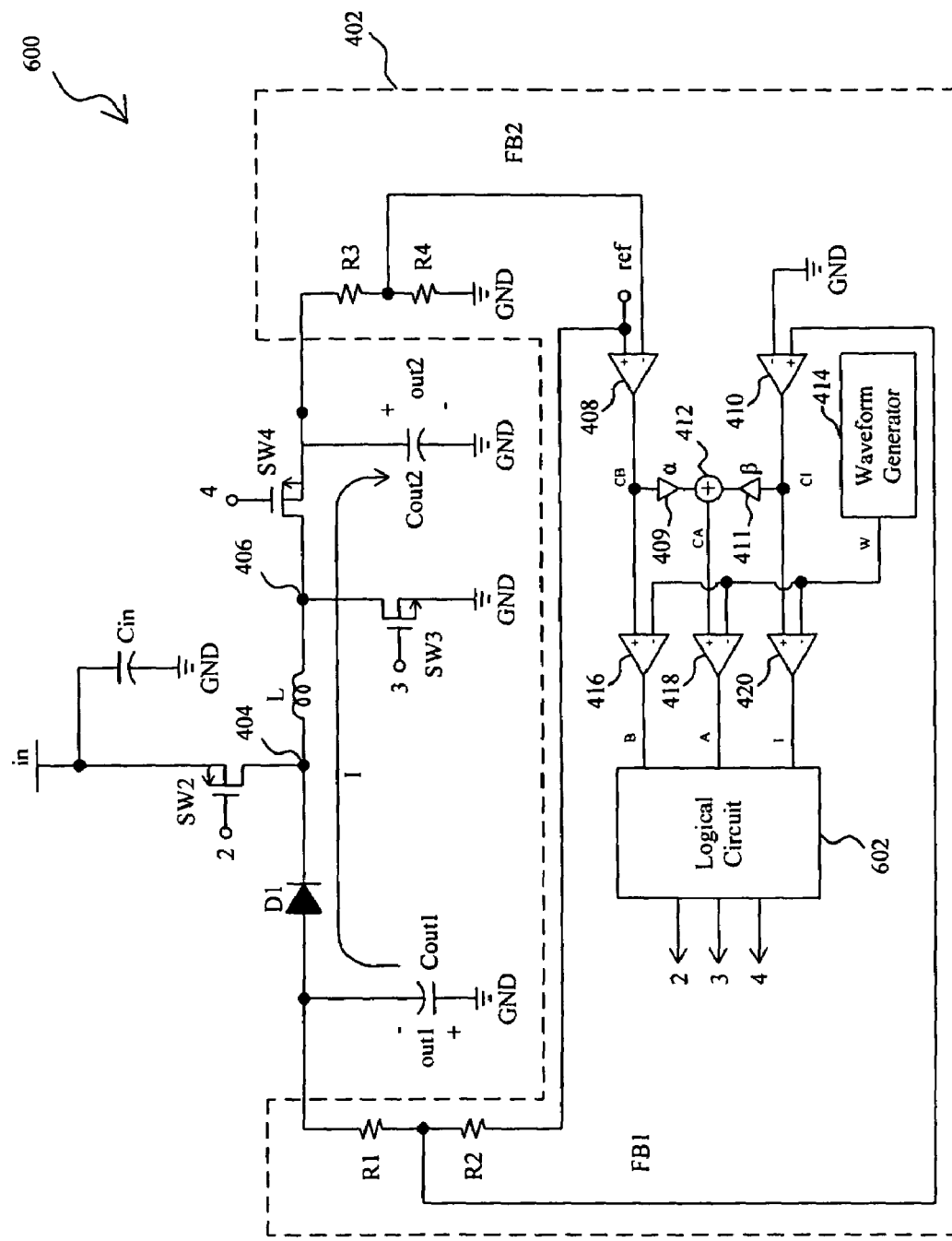

FIGS. 7A to 7C show a synchronous-boost-asynchronous-inverting converter 600 operating in a boost-inverting mode, which has a similar configuration to that of the first embodiment converter 400 except that the switch SW1 between the capacitor Cout1 and node 404 is replaced by a diode D1 and accordingly, only three drive signals V2, V3 and V4 are required for switching the switches SW2, SW3 and SW4, respectively. In the control apparatus 402, the control signals $V_B$, $V_A$ and $V_I$ are produced in the same way as that of the first embodiment converter 400 and again, the control signal $V_A$ is used to ensure that the inductor L will be sufficiently energized. In addition, the drive signals V2, V3 and V4 produced by the logical circuit 602 are the same as those shown in FIG. 6.

Figure 8:
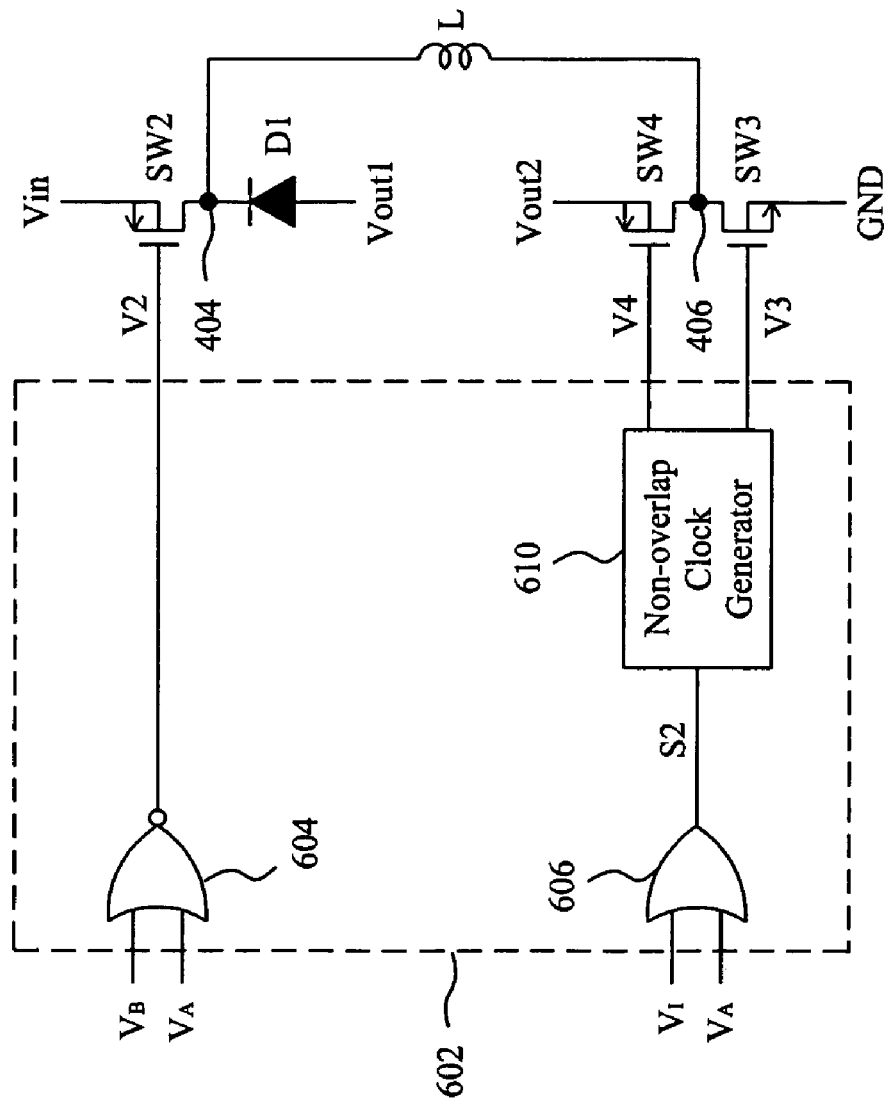
FIG. 8 shows an embodiment for the logical circuit of the converter shown in FIG. 7.

For the logical circuit 602, FIG. 8 shows an embodiment having the same configuration as that of the logical circuit 422 shown in FIG. 5, in which a NOR gate 604 produces the drive signal V2 for switching the switch SW2, and an OR gate 606 produces a signal S2 in response to the control signals $V_A$ and $V_I$ for a non-overlap clock generator 610 to produce the drive signals V3 and V4 for switching the switches SW3 and SW4. The non-overlap clock generator 610 prevents the duty cycles of the drive signals V3 and V4 from overlapping with each other, and thus the switches SW3 and SW4 will not turn on simultaneously. In this embodiment, the switch SW3 is an NMOS and the switch SW4 is a PMOS, and hence the drive signals V3 and V4 have the same phase as shown in FIG. 6. In other embodiments, the drive signals V3 and V4 may be inverse to the other in phase, if the switches SW3 and SW4 are both PMOSes or NMOSes.

With reference to FIGS. 6, 7A and 8, when the converter 600 operates in the period from time T0 to time T1, the signal $V_W$ is lower than each of the error signals $V_{CI}$, $V_{CB}$ and $V_{CA}$. Hence, the control signals $V_I$, $V_B$ and $V_A$ are all at high level, the drive signal V2 is at low level, and the drive signals V3 and V4 are at high level. Therefore, the switches SW2 and SW3 turn on, the switch SW4 turns off, and as shown in FIG. 7A, the current I flows from the input Vin to ground GND through the switch SW2, inductor L and switch SW3, thereby energizing the inductor L. In the period between time T1 and time T2, the control signals $V_I$ and $V_A$ are still at high level, while the control signal $V_B$ transits to low level. Because of the control signal $V_A$ at high level, the switches SW2 and SW3 still turn on and the switch SW4 still turns off, so that the inductor L is still energized.

With reference to FIGS. 6, 7B and 8, in the period between time T2 and time T3, the signal $V_W$ is higher than the error signals $V_{CB}$ and $V_{CA}$, but lower than the error signal $V_{CI}$. Hence, the control signal $V_I$ is at high level, the control signals $V_B$ and $V_A$ are at low level, and the drive signals V2, V3 and V4 are all at high level. The switches SW2 and SW4 turn off, the switch SW3 turns on, the inductor L is relaxed, and the current I flows from the capacitor Cout1 to ground GND through the diode D1, inductor L and switch SW3 as shown in FIG. 7B. The capacitor Cout1 is thus discharged to produce the inverting voltage Vout1.

With reference to FIGS. 6, 7C and 8, when the converter 600 operates in the period between time T3 and time T4, the signal $V_W$ is higher than each of the error signals $V_{CB}$, $V_{CI}$ and $V_{CA}$, and hence the control signals $V_B$, $V_I$ and $V_A$ are all at low level, resulting in the drive signal V2 at high level and the drive signals V3 and V4 at low level. Subsequently, the switches SW2 and SW3 turn off and the switch SW4 turns on, so that as shown in FIG. 7C, the current I flows from the capacitor Cout1 to the capacitor Cout2 through the diode D1, inductor L and switch SW4, thereby discharging the capacitor Cout1 to produce the inverting voltage and charging the capacitor Cout2 to produce the boost voltage Vout2. When the current I is lower than a zero threshold, the switch SW4 turns off immediately.

With reference to FIGS. 6, 7B and 8 again, when the converter 600 operates in the period between time T4 and time T5, the signal $V_W$ is higher than the error signals $V_{CB}$ and $V_{CA}$, but lower than the error signal $V_{CI}$. Hence, the control signal $V_I$ is at high level, the control signals $V_B$ and $V_A$ are at low level, and the drive signals V2, V3 and V4 are all at high level, so that the switches SW2 and SW4 turn off, the switch SW3 turns on, and the current I flows from the capacitor Cout1 to ground GND through the diode D1, inductor L and switch SW3 as shown in FIG. 7B, thereby discharging the capacitor Cout1.

With reference to FIGS. 6, 7A and 8, in the period between time T5 and time T6, the signal $V_W$ is lower than the error signals $V_{CI}$ and $V_{CA}$, but higher than the error signal $V_{CB}$. Hence, the control signals $V_I$ and $V_A$ are at high level, the control signal $V_B$ is at low level, the drive signal V2 is at low level, and the drive signals V3 and V4 are at high level. As a result, the switches SW2 and SW3 turn on, the switch SW4 turns off, the current I flows from the input Vin to ground GND through the switch SW2, inductor L and switch SW3 as shown in FIG. 7A, and the inductor L is energized again.

3. Third Embodiment

Asynchronous-Boost-Synchronous-Inverting Converter

Figure 9A:
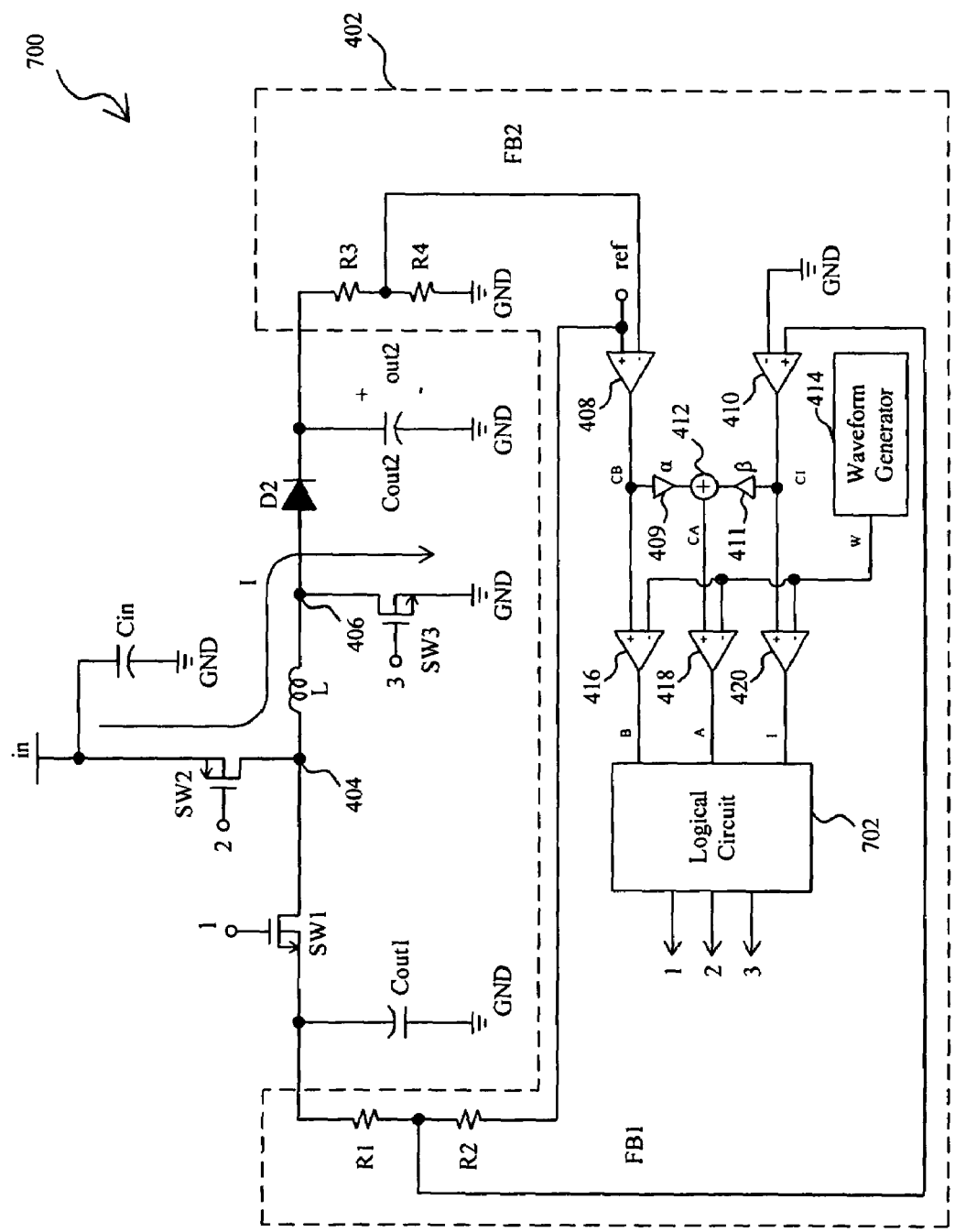
FIGS. 9A to 9C show an asynchronous-boost-synchronous-inverting converter operating in a boost-inverting mode.
Figure 9B:
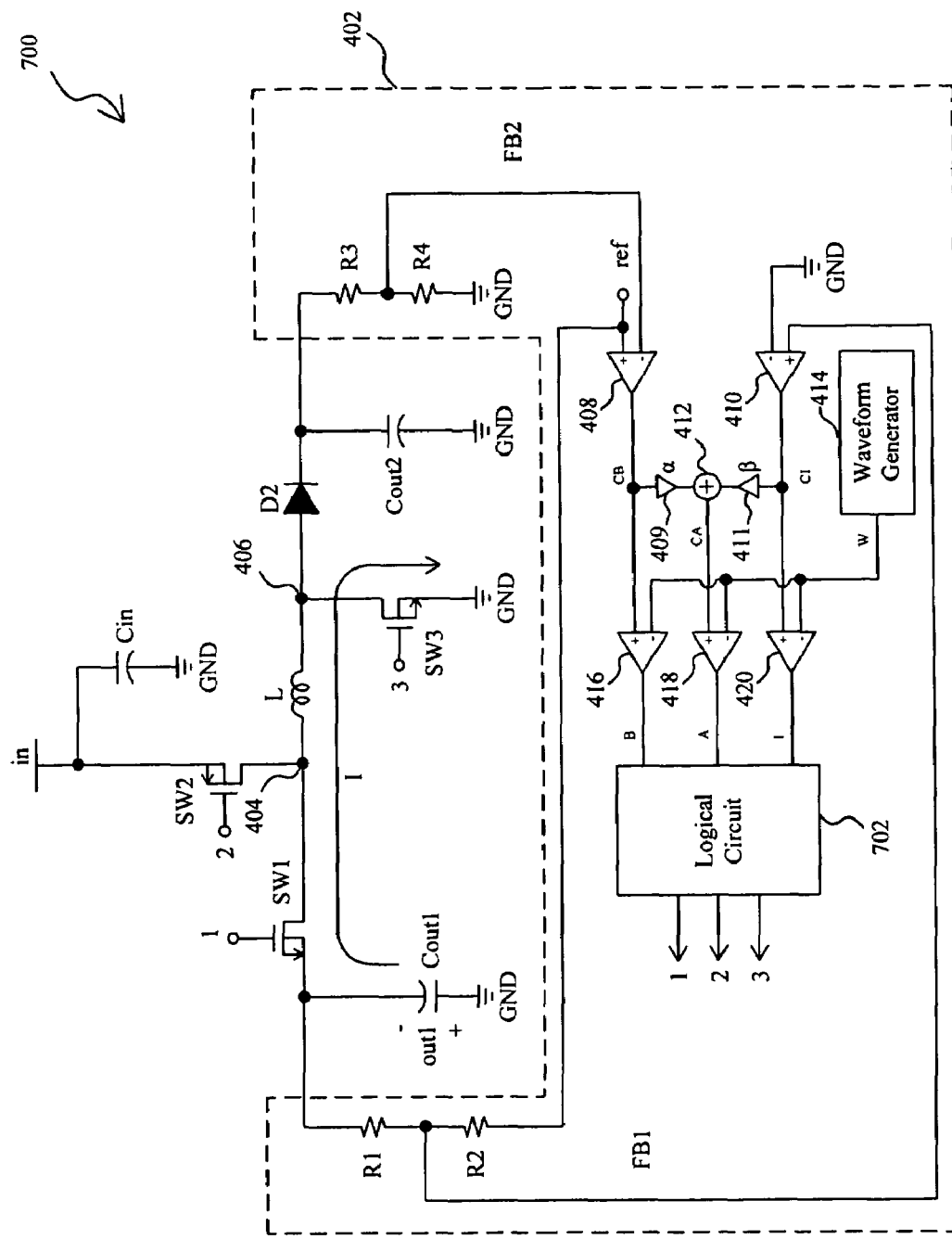
Figure 9C:
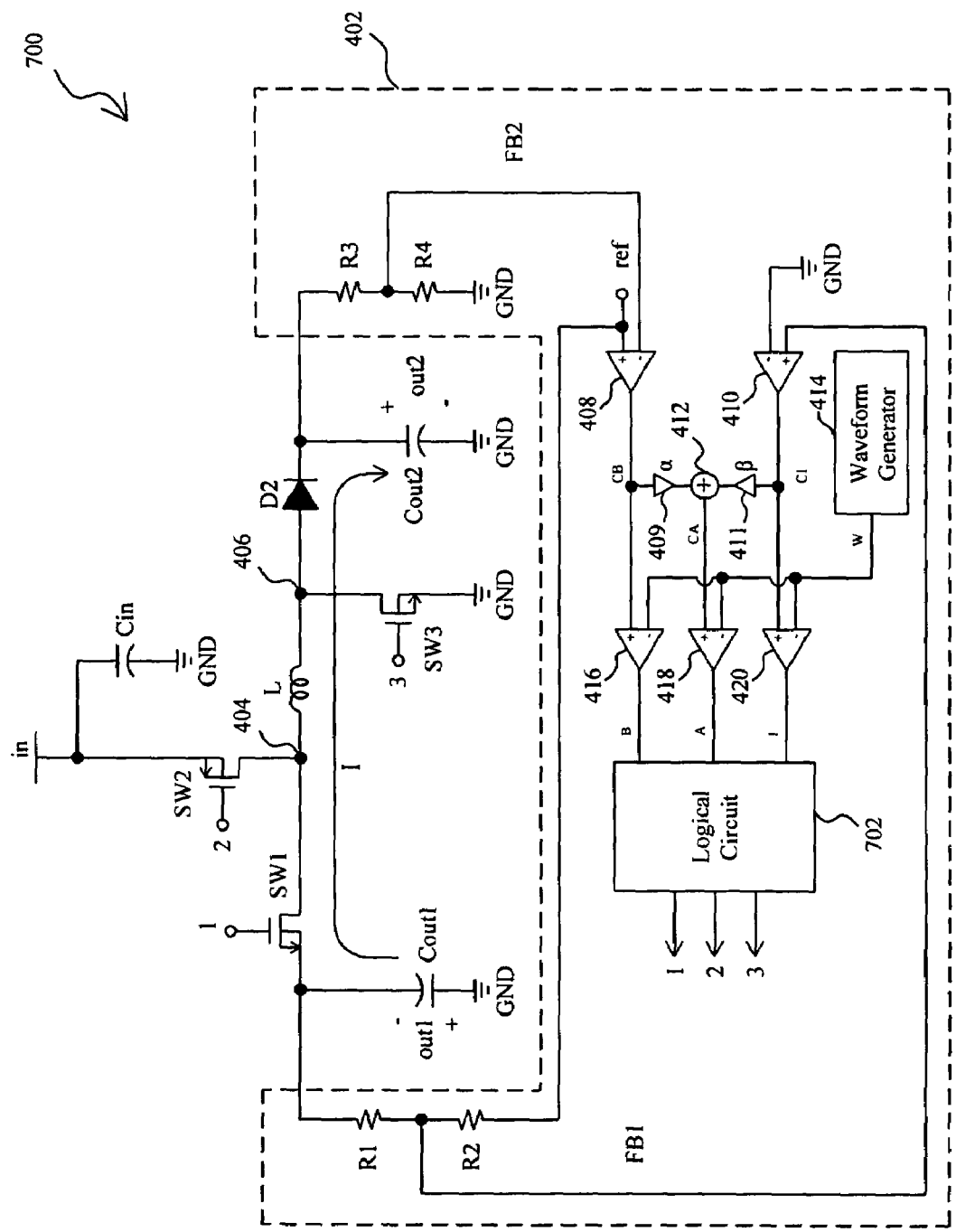

FIGS. 9A to 9C show an asynchronous-boost-synchronous-inverting converter 700 operating in a boost-inverting mode, which has a similar configuration to that of the first embodiment converter 400 except that the switch SW4 between the capacitor Cout2 and node 406 is replaced by a diode D2 and accordingly, only three drive signals V1, V2 and V3 are required for switching the switches SW1, SW2 and SW3, respectively. In the control apparatus 402, the control signals $V_B$, $V_A$ and $V_I$ are produced in the same way as that of the first embodiment converter 400 and again, the control signal $V_A$ is used to ensure that the inductor L will be sufficiently energized. In addition, the drive signals V1, V2 and V3 produced by the logical circuit 702 are the same as those shown in FIG. 6.

Figure 10:
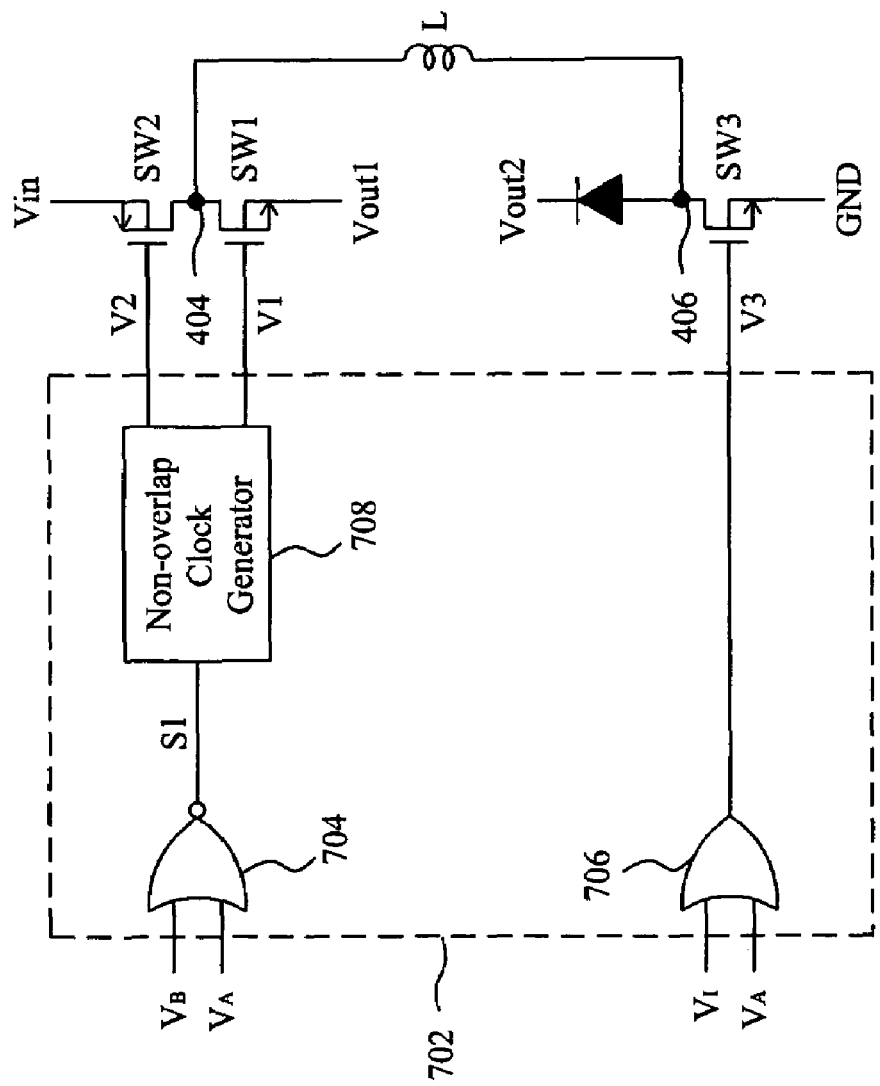
FIG. 10 shows an embodiment for the logical circuit of the converter shown in FIG. 9.

For the logical circuit 702, FIG. 10 shows an embodiment having the same configuration as that of the logical circuit 422 shown in FIG. 5, in which a NOR gate 704 produces a signal S1 in response to the control signals $V_A$ and $V_B$ for a non-overlap clock generator 708 to produce the drive signals V1 and V2 for switching the switches SW1 and SW2, and an OR gate 706 produces the drive signal V3 for switching the switch SW3. The non-overlap clock generator 708 prevents the duty cycles of the drive signals V1 and V2 from overlapping with each other, and thus the switches SW1 and SW2 will not turn on simultaneously. In this embodiment, the switch SW1 is an NMOS and the switch SW2 is a PMOS, and hence the drive signals V1 and V2 have the same phase as shown in FIG. 6. In other embodiments, the drive signals V1 and V2 may be inverse to the other in phase, if the switches SW1 and SW2 are both PMOSes or NMOSes.

With reference to FIGS. 6, 9A and 10, when the converter 700 operates in the period between time T0 and time T1, the signal $V_W$ generated by the waveform generator 414 is lower than each of the error signals $V_{CI}$, $V_{CB}$ and $V_{CA}$. Hence, the control signals $V_I$, $V_B$ and $V_A$ are all at high level, the drive signals V1 and V2 are at low level, the drive signal V3 is at high level, the switch SW1 turns off, and the switches SW2 and SW3 turn on, so that as shown in FIG. 9A, the current I flows from the input Vin to ground GND through the switch SW2, inductor L and switch SW3, to thereby energize the inductor L. In the period between time T1 and time T2, the control signals $V_I$ and $V_A$ are still at high level, but the control signal $V_B$ is at low level. Because of the control signal $V_A$ at high level, the switch SW1 still turns off, and the switches SW2 and SW3 still turn on, so that the inductor L is still energized.

With reference to FIGS. 6, 9B and 10, in the period between time T2 and time T3, the signal $V_W$ is higher than the error signals $V_{CB}$ and $V_{CA}$, but lower than the error signal $V_{CI}$. Hence, the control signal $V_I$ is at high level, the control signals $V_B$ and $V_A$ are at low level, the drive signals V1, V2 and V3 are all at high level, the switches SW1 and SW3 turn on, the switch SW2 turns off, the current I flows from the capacitor Cout1 to ground GND through the switch SW1, inductor L and switch SW3, as shown in FIG. 9B, and the capacitor Cout1 is discharged to produce the inverting voltage Vout1.

With reference to FIGS. 6, 9C and 10, when the converter 700 operates in the period between time T3 and time T4, the signal $V_W$ is higher than each of the error signals $V_{CB}$, $V_{CI}$ and $V_{CA}$. Hence, the control signals $V_B$, $V_I$ and $V_A$ are all at low level, the drive signals V1 and V2 are at high level, the drive signal V3 is at low level, the switch SW1 turns on, the switches SW2 and SW3 turn off, and the current I flows from the capacitor Cout1 to the capacitor Cout2 through the switch SW1, inductor L and diode D2, as shown in FIG. 9C, so that the capacitor Cout1 is discharged to produce the inverting voltage Vout1 and the capacitor Cout2 is charged to produce the boost voltage Vout2. When the current I is lower than zero threshold, the switch SW1 turns off immediately.

Referring back to FIGS. 6, 9B and 10, when the converter 700 operates in the period between time T4 and time T5, the signal $V_W$ is higher than the error signals $V_{CB}$ and $V_{CA}$, but lower than the error signal $V_{CI}$. Hence, the control signal $V_I$ is at high level, the control signals $V_B$ and $V_A$ are at low level, the drive signals V1, V2 and V3 are at high level, the switches SW1 and SW3 turn on, the switch SW2 turns off, the current I flows from the capacitor Cout1 to ground GND through the switch SW1, inductor L and switch SW3, as shown in FIG. 9B, and the capacitor Cout1 is discharged.

With reference to FIGS. 6, 9A and 10 again, when the converter 700 operates in the period between time T5 and time T6, the signal $V_W$ is lower than the error signals $V_{CI}$ and $V_{CA}$, but higher than the error signal $V_{CB}$. Hence, the control signals $V_I$ and $V_A$ are at high level, the control signal $V_B$ is at low level, the drive signals V1 and V2 are at low level, the drive signal V3 is at high level, the switch SW1 turns off, the switches SW2 and SW3 turn on, the current I flows from the input Vin to ground GND through the switch SW2, inductor L and switch SW3, as shown in FIG. 9A, and thereby the inductor L is energized again.

4. Fourth Embodiment

Asynchronous-Boost-Asynchronous-Inverting Converter

Figure 11A:
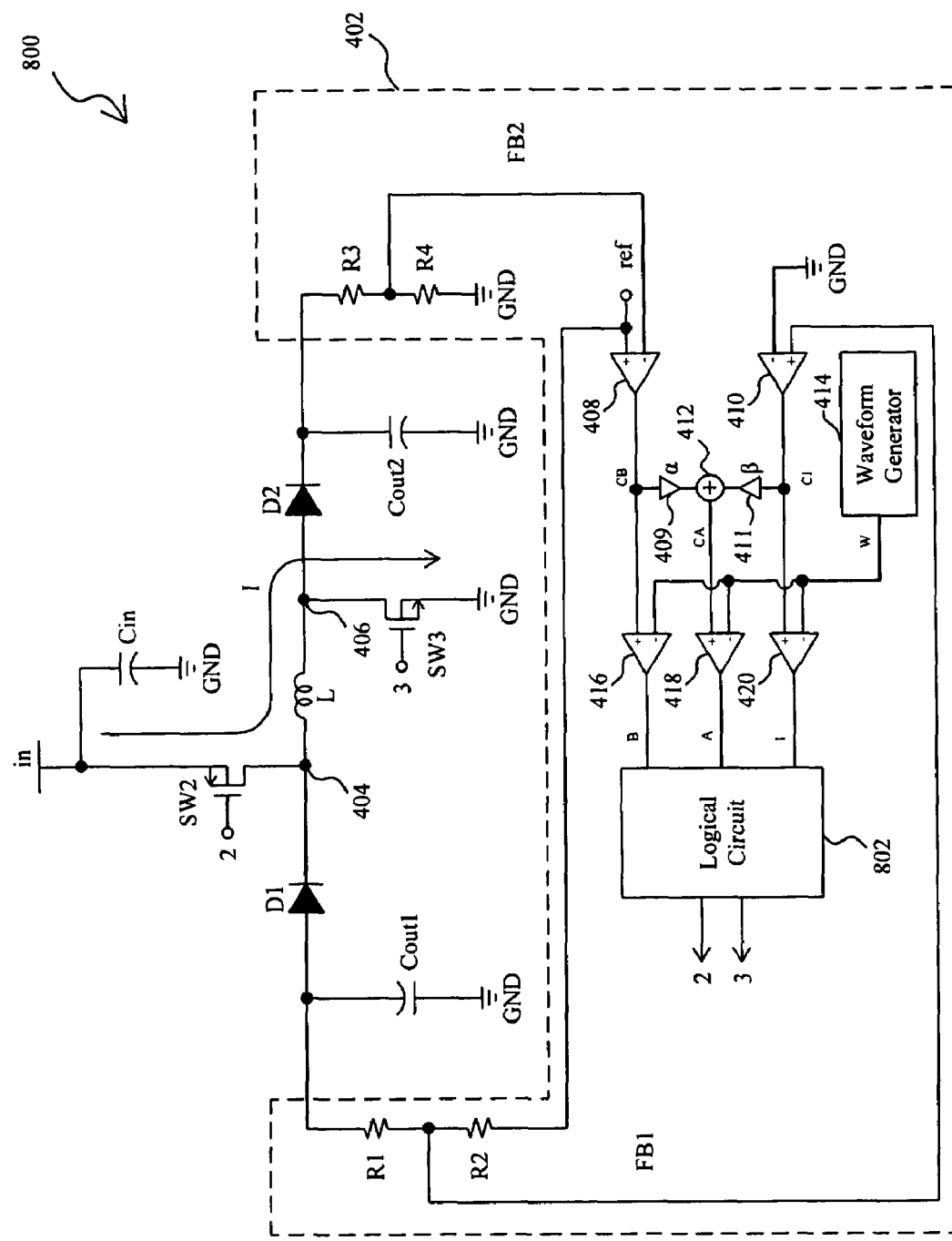
FIGS. 11A to 11C show an asynchronous-boost-asynchronous-inverting converter operating in a boost-inverting mode
Figure 11B:
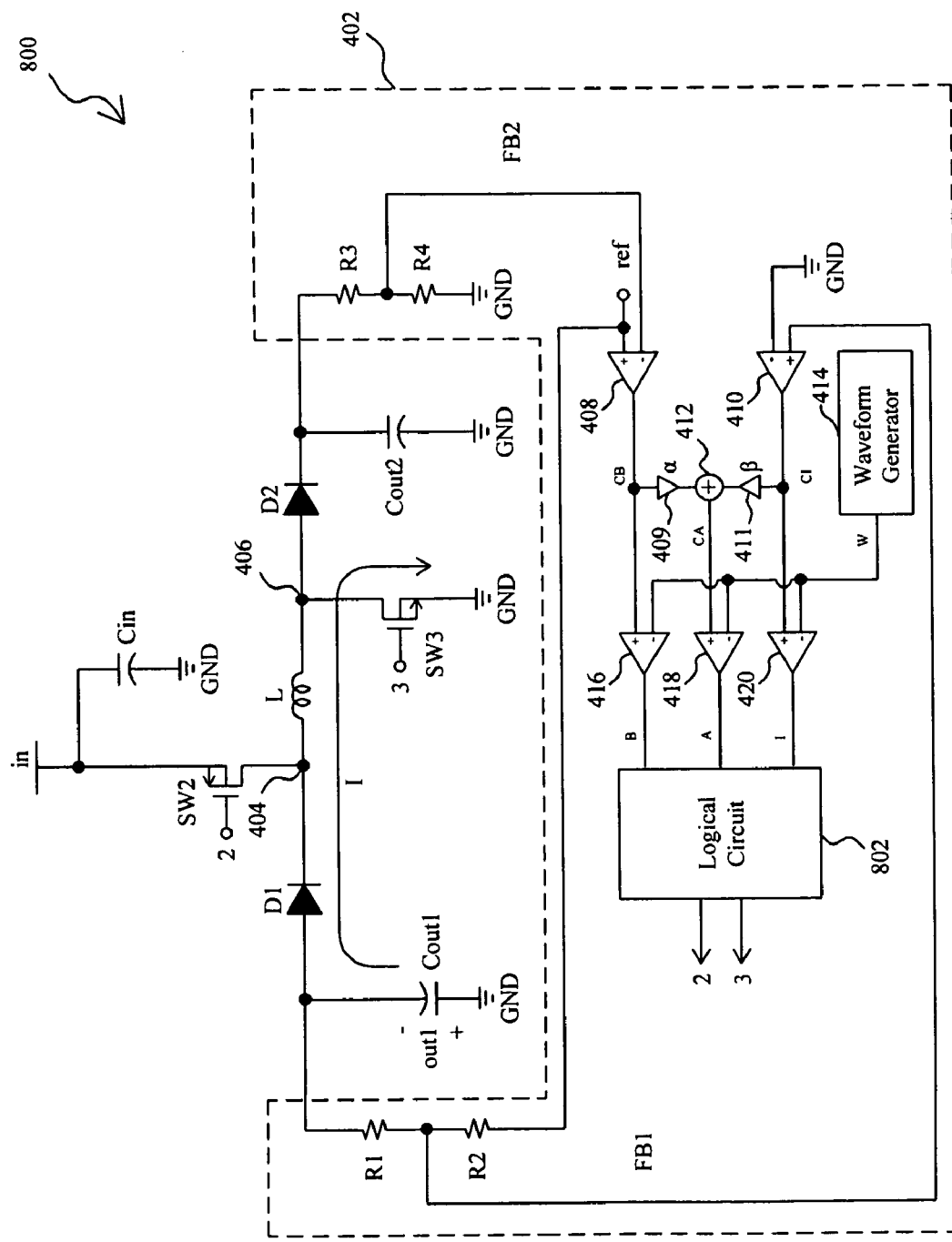
Figure 11C:
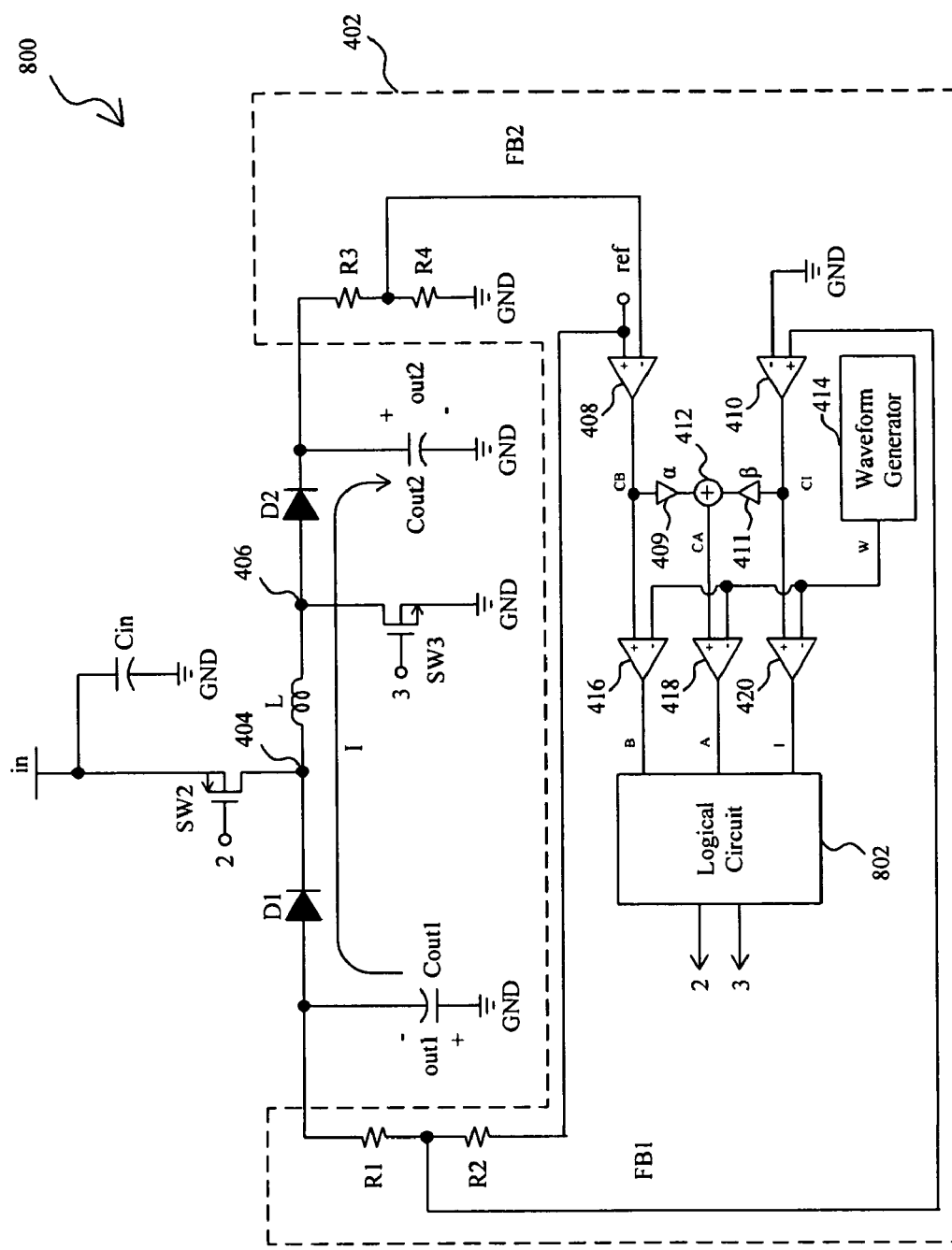
Figure 12:
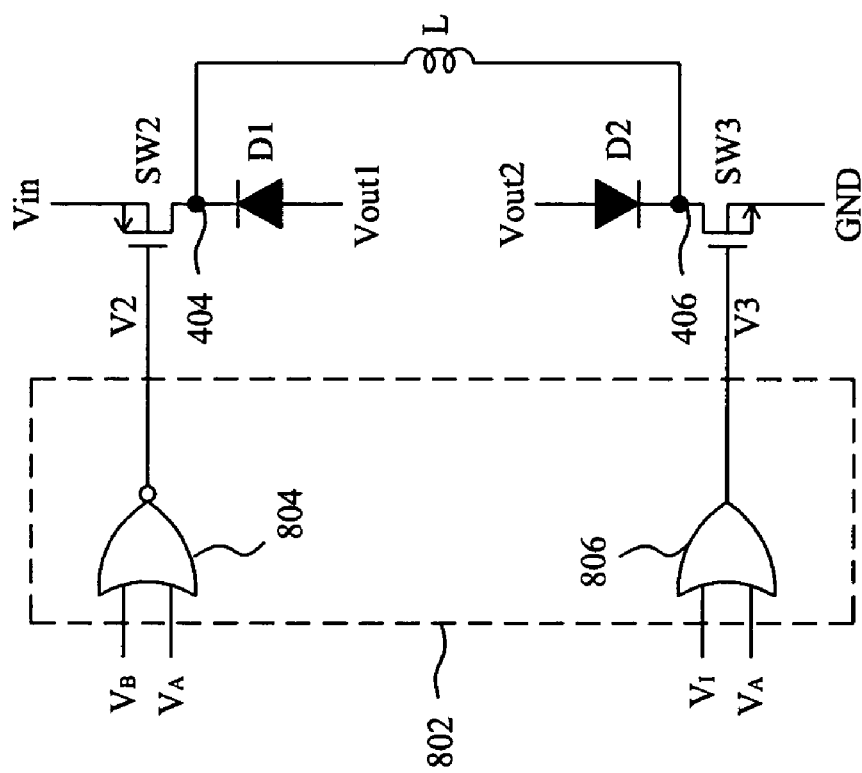
FIG. 12 shows an embodiment for the logical circuit of the converter shown in FIG. 11.

FIGS. 11A to 11C show an asynchronous-boost-asynchronous-inverting converter 800 operating in a boost-inverting mode, which has a similar configuration to that of the third embodiment converter 700 except that the switch SW1 between the capacitor Cout1 and node 404 is also replaced by a diode D1 and accordingly, only two drive signals V2 and V3 are required for switching the switches SW2 and SW3, respectively. In the control apparatus 402, the control signals $V_B$, $V_A$ and $V_I$ are produced in the same way as that of the first embodiment converter 400 and again, the control signal $V_A$ is used to ensure that the inductor L will be sufficiently energized. In addition, the drive signals V2 and V3 produced by the logical circuit 802 are the same as those shown in FIG. 6, and for which FIG. 12 shows an embodiment having the same configuration as that of the logical circuit 422 shown in FIG. 5. Namely, the logical circuit 802 has a NOR gate 804 in response to the control signals $V_A$ and $V_B$ to produce the drive signal V2 for switching the switch SW2, and an OR gate 806 in response to the control signals $V_A$ and $V_I$ to produce the drive signal V3 for switching the switch SW3.

With reference to FIGS. 6, 11A and 12, when the converter 800 operates in the period between time T0 and time T1, the signal $V_W$ is lower than each of the error signals $V_{CI}$, $V_{CB}$ and $V_{CA}$. Hence, the control signals $V_I$, $V_B$ and $V_A$ are all at high level, the drive signal V2 is at low level, the drive signal V3 is at high level, the switches SW2 and SW3 turn on, and the current I flows from the input Vin to ground GND through the switch SW2, inductor L and switch SW3, as shown in FIG. 11A, so that the inductor L is energized. In the period between time T1 and time T2, the control signals $V_I$ and $V_A$ are still at high level, but the control signal $V_B$ transits to low level. Due to the control signal $V_A$ at high level, the switches SW2 and SW3 still turn on, so that the inductor L is still energized.

With reference to FIGS. 6, 11B and 12, in the period between time T2 and time T3, the signal $V_W$ is higher than the error signals $V_{CB}$ and $V_{CA}$, but lower than the error signal $V_{CI}$. Hence, the control signal $V_I$ is at high level, the control signals $V_B$ and $V_A$ are at low level, and the drive signals V2 and V3 are at high level, the switch SW2 turns off, the switch SW3 turns on, the current I flows from the capacitor Cout1 to ground GND through the diode D1, inductor L and switch SW3, as shown in FIG. 11B, and the capacitor Cout1 is discharged to produce the inverting voltage Vout1.

With reference to FIGS. 6, 11C and 12, in the period between time T3 and time T4, the signal $V_W$ is higher than each of the error signals $V_{CB}$, $V_{CI}$ and $V_{CA}$. Hence, the control signals $V_B$, $V_I$ and $V_A$ are all at low level, the drive signal V2 is at high level, the drive signal V3 is at low level, the switches SW2 and SW3 both turn off, and the current I flows from the capacitor Cout1 to the capacitor Cout2 through the diode D1, inductor L and diode D2, as shown in FIG. 11C, thereby discharging the capacitor Cout1 to produce the inverting voltage and charging the capacitor Cout2 to produce the boost voltage Vout2.

With reference to FIGS. 6, 11B and 12, when the converter 800 operates in the period between time T4 and time T5, the signal $V_W$ is higher than the error signals $V_{CB}$ and $V_{CA}$, but lower than the error signal $V_{CI}$. Hence, the control signal $V_I$ is at high level, the control signals $V_B$ and $V_A$ are at low level, the drive signals V2 and V3 are at high level, the switch SW2 turns off, the switch SW3 turns on, the current I flows from the capacitor Cout1 to ground GND through the diode D1, inductor L and switch SW3 as shown in FIG. 11B, and the capacitor Cout1 is discharged.

With reference to FIGS. 6, 11A and FIG. 12, when the converter 800 operates in the period between time T5 and time T6, the signal $V_W$ is lower than the error signals $V_{CI}$ and $V_{CA}$, but higher than the error signal $V_{CB}$. Hence, the control signals $V_I$ and $V_A$ are at high level, the control signal $V_B$ is at low level, the drive signal V2 is at low level, the drive signal V3 is at high level, the switches SW2 and SW3 both turn on, the current I flows from the input Vin to ground GND through the switch SW2, inductor L and switch SW3, as shown in FIG. 11A, and the inductor L is thereby energized again.

Figure 1A:
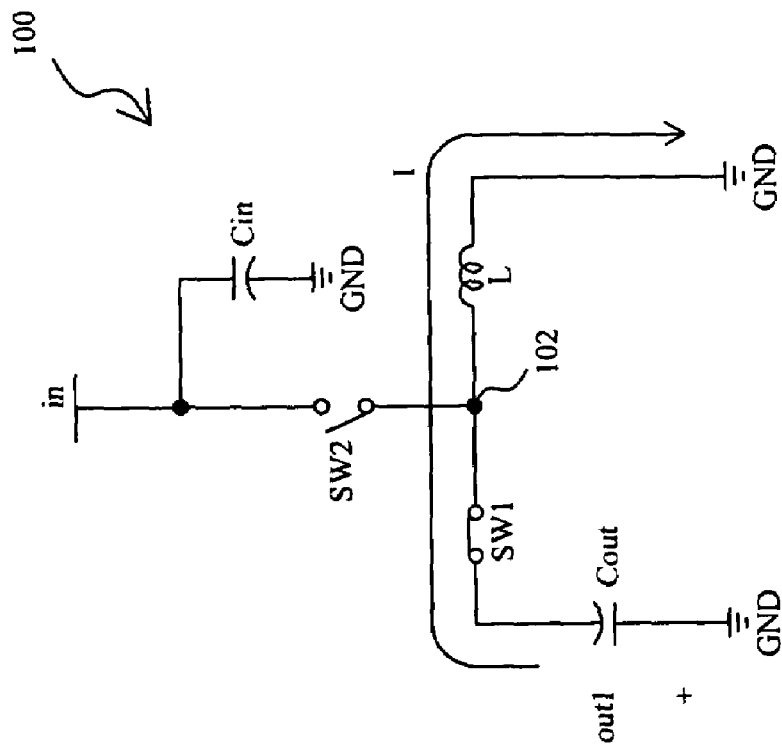
FIG. 1A shows a conventional inverting converter when the inductor thereof is energized.
Figure 1B:
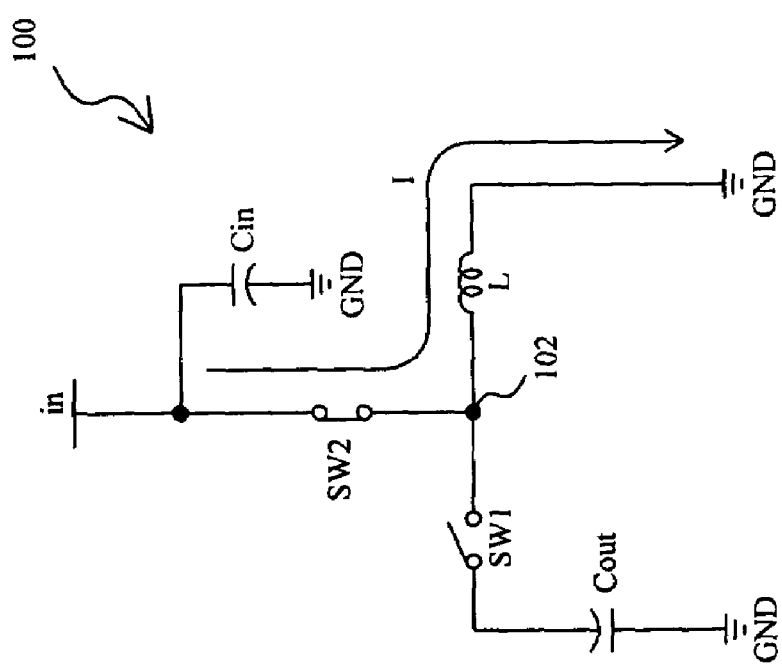
FIG. 1B shows how the inverting converter of FIG. 1A produces an inverting voltage.
Figure 2B:
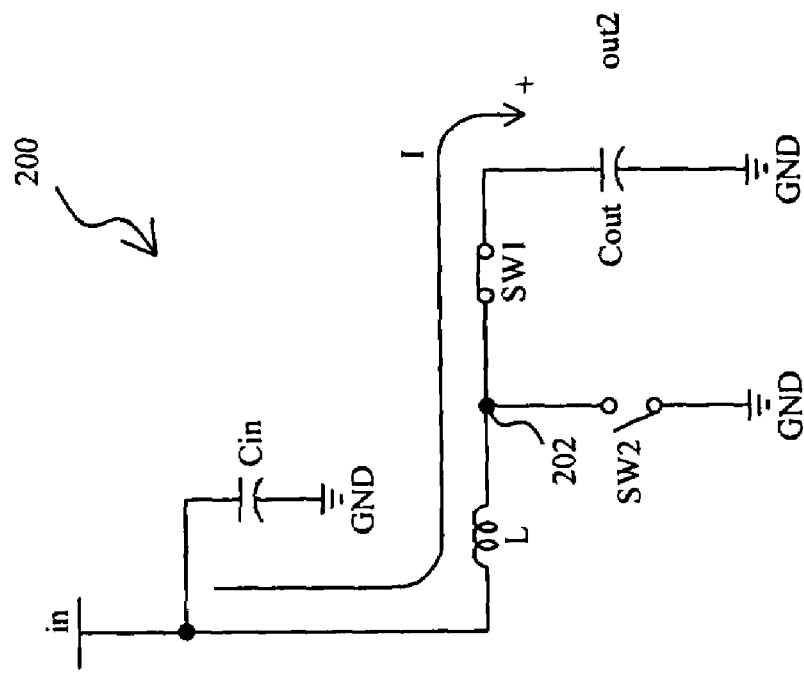
FIG. 2B shows how the boost converter of FIG. 2A produces a boost voltage.
Figure 2A:
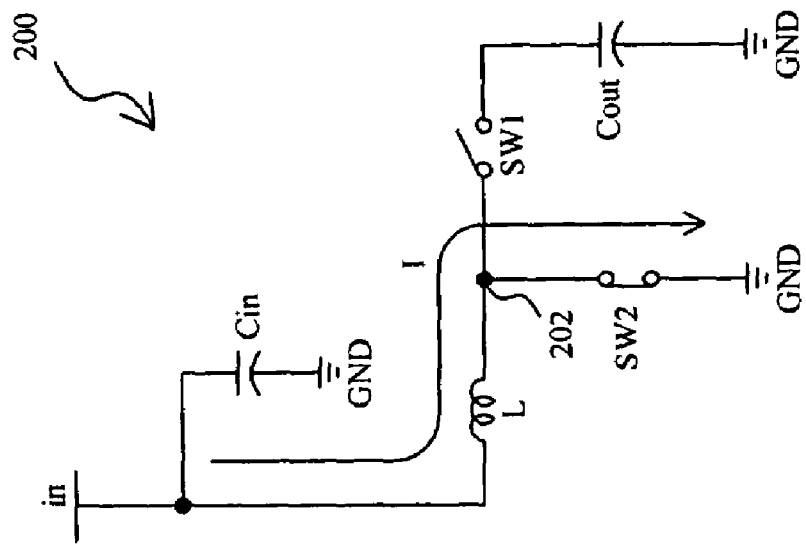
FIG. 2A shows a conventional boost converter when the inductor thereof is energized.
Figure 3C:
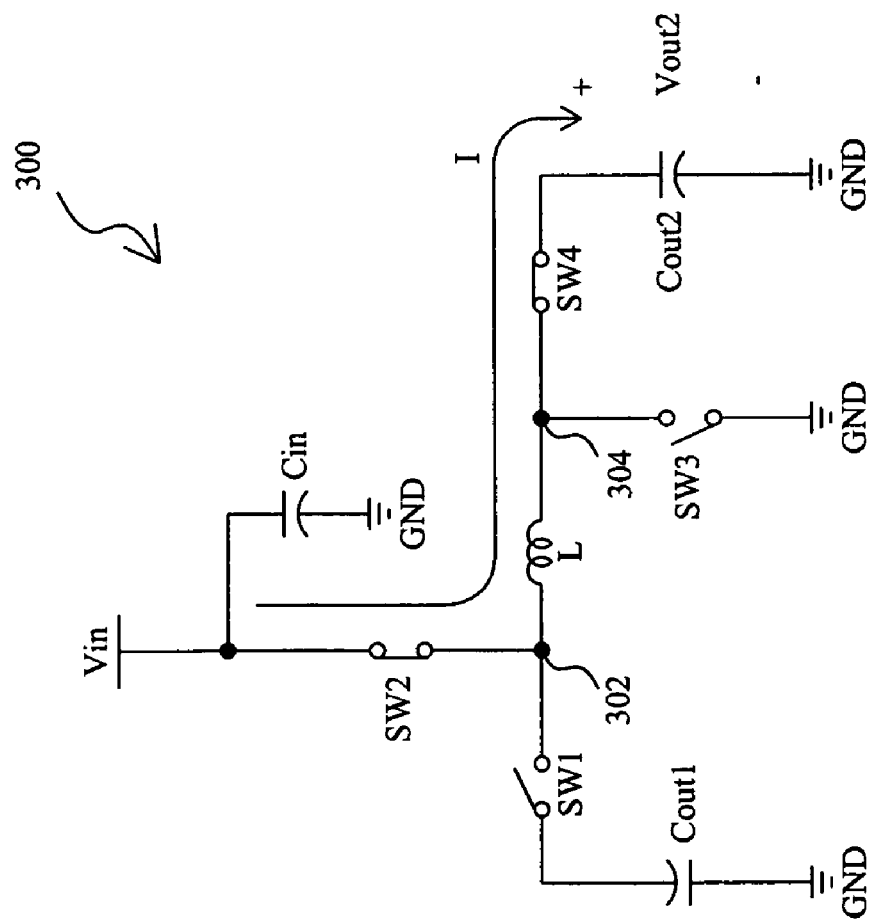
FIG. 3C shows how the boost-inverting converter of FIG. 3A produces a boost voltage.

As shown in the above embodiments, when a boost-inverting converter of the present invention operates in a boost-inverting mode, the inductor L is energized only once in order to produce an inverting voltage Vout1 and a boost voltage Vout2, and therefore the incomplete energy release problem will not exit any more. On the other hand, for the operations of the above converters 400, 500, 600, 700 and 800 in an inverting mode and in a boost mode, the detail may refer to the description for the conventional boost-inverting converter 300 shown in FIG. 3.

In addition, although the signal $V_W$ produced by the waveform generator 414 in the above embodiment converters 400, 500, 600, 700 and 800 is a triangular waveform for illustration, other types of waveforms such as sawtooth waveform may also applicable in other embodiments.

Furthermore, the switches may be switched in alternative orders for implementing various operational processes and the signal $V_W$ may be modified to vary with the levels of the error signals $V_{CB}$, $V_{CA}$ and $V_{CI}$, for example in a manner that the signal $V_W$ is generated varying with the drive signals.

5. Fifth Embodiment

Alternative Switching Order and Modified Signal $V_W$

Figure 13:
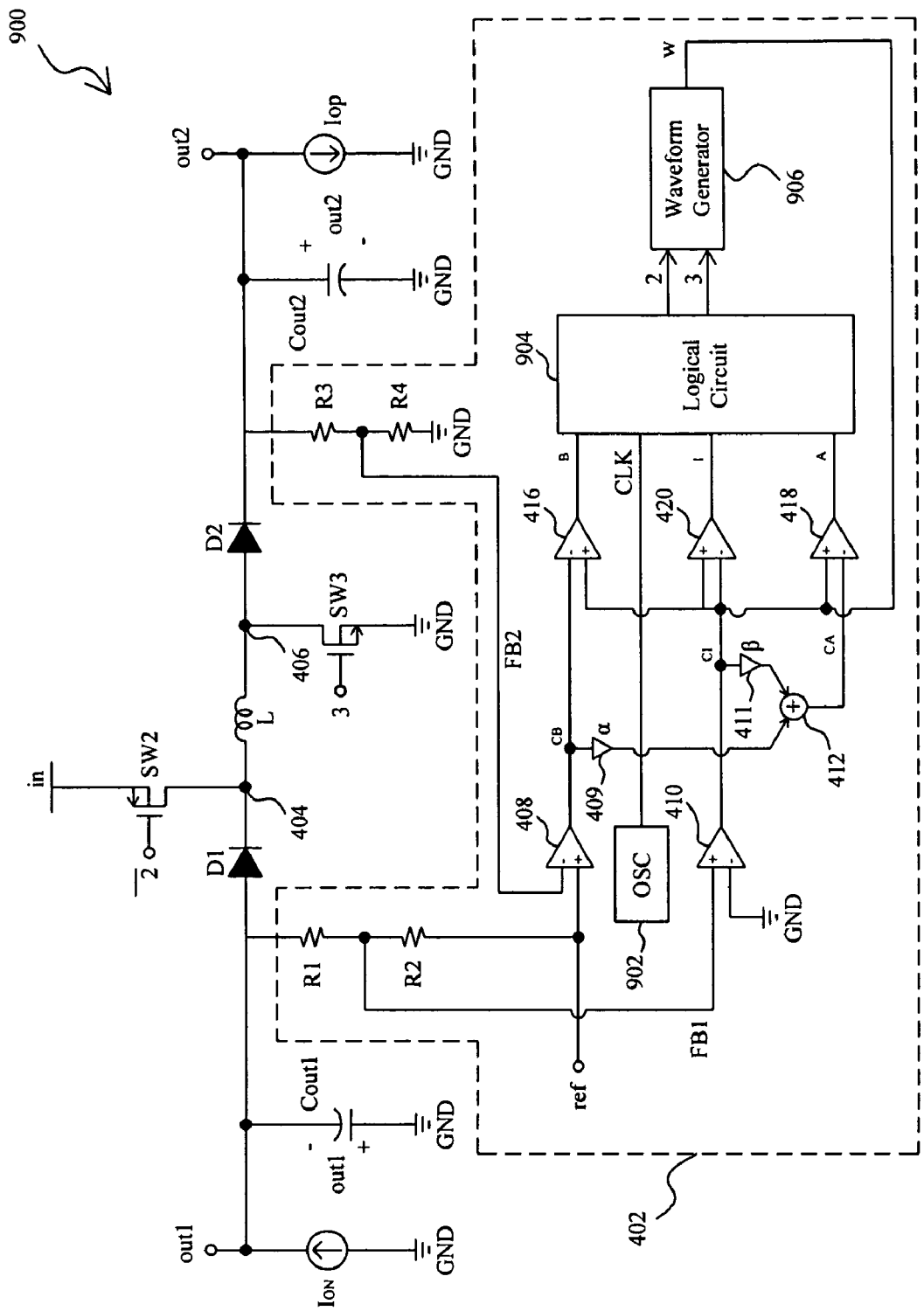
FIG. 13 shows a modification of the converter shown in FIG. 11.

As shown in FIG. 13, an asynchronous-boost-asynchronous-inverting converter 900 is a modification of the fourth embodiment converter 800, in which for the comparators 416, 418 and 420 to compare with the error signals $V_{CI}$, $V_{CB}$ and $V_{CA}$ to determine the control signals $V_B$, $V_A$ and $V_I$, a waveform generator 906 produces the signal $V_W$ varying with the drive signals V2 and V3. In the control apparatus 402, the control signals $V_B$, $V_A$ and $V_I$ are produced in the same way as that of the first embodiment converter 400 and again, the control signal $V_A$ is used to ensure that the inductor L will be sufficiently energized. With an additional oscillator 902 to supply a clock signal CLK, a logical circuit 904 produces the drive signals V2 and V3 for switching the switches SW2 and SW3. However, the drive signal V2 is inverted to switch SW2. The switch SW2 is a PMOS and the switch SW3 is an NMOS. In addition, a current source $I_{ON}$ is connected to the output Vout1, and a current source $I_{OP}$ is connected to the output Vout2, which represent the load currents at the outputs Vout1 and Vout2 of the converter 900.

Figure 14:
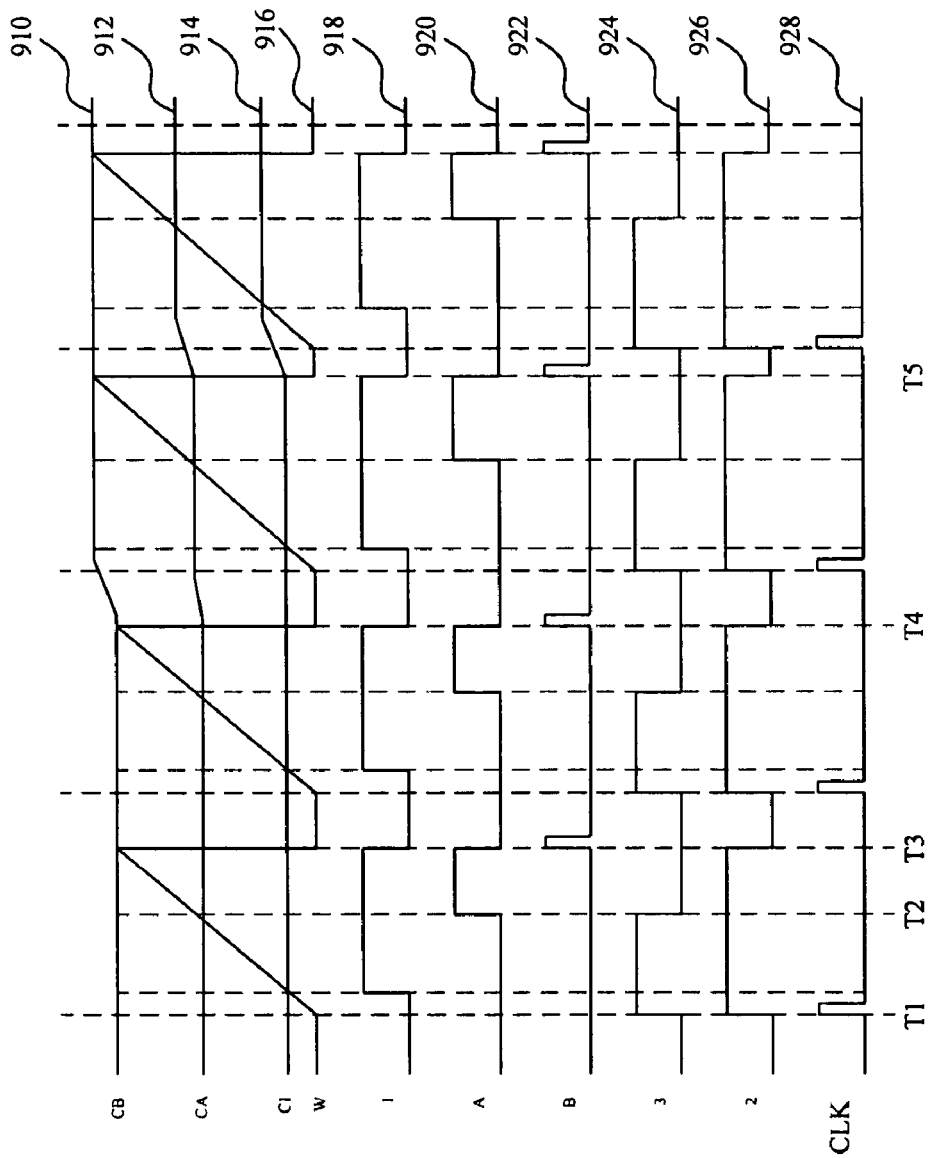
FIG. 14 is a timing diagram of various signals in the converter shown in FIG. 13.

FIG. 14 is a timing diagram of various signals in the converter 900, in which waveform 910 represents the error signal $V_{CB}$, waveform 912 represents the error signal $V_{CA}$, waveform 914 represents the error signal $V_{CI}$, waveform 916 represents the signal $V_W$, waveform 918 represents the control signal $V_I$, waveform 920 represents the control signal $V_A$, waveform 922 represents the control signal $V_B$, waveform 924 represents the drive signal V3, waveform 926 represents the drive signal V2, and waveform 928 represents the clock signal CLK. In this embodiment, if the current of the current source $I_{OP}$ is higher than the current of the current source $I_{ON}$, the error signal $V_{CB}$ produced by the error amplifier 408 will be higher than the error signal $V_{CI}$ produced by the error amplifier 410. With reference to FIGS. 13 and 14, at time T1, the clock signal CLK transits from low level to high level, and the drive signals V2 and V3 transit to high level accordingly, so that the switches SW2 and SW3 turn on to energize the inductor L, and the signal $V_W$ begins to rise up. At time T2, the signal $V_W$ is crossing over the error signal $V_{CA}$, so that the control signal $V_A$ transits from low level to high level, and the drive signal V3 transits to low level accordingly. Thereby the switch SW3 turns off, by which the inductor L stops being energized and the capacitor Cout2 is charged to produce the boost voltage Vout2. At time T3, the signal $V_W$ reaches the error signal $V_{CB}$, so that the control signal $V_B$ transits to high level and the drive signal V2 transits to low level accordingly. As a result, the switch SW2 turns off, the capacitor Cout1 is discharged to produce the inverting voltage Vout1 and the capacitor Cout2 is charged to produce the boost voltage Vout2. At the same time, the signal $V_W$ is reset, and it will rise up again only when the clock signal CLK transits to high level next time.

In the converter 900, the level of the error signal $V_{CA}$ will vary with the load current such that the inductor L will be ensured to be sufficiently energized. Referring to FIG. 14, at time T4, the current of the current source $I_{OP}$ increases, the error signal $V_{CB}$ rises up accordingly, and the error signal $V_{CA}$ also rises up in follow to the increasing error signal $V_{CB}$. Hence, the time that the inductor L will be energized is prolonged, so that the inductor L will be sufficiently energized. At time T5, the current of the current source $I_{ON}$ increases, the error signal $V_{CI}$ rises up accordingly, and the error signal $V_{CA}$ also rises up in follow to the increasing error signal $V_{CI}$. Hence, the time that the inductor L will be energized is prolonged, so that the inductor L will be sufficiently energized. This technique is also applicable to a synchronous-boost-synchronous-inverting converter, synchronous-boost-asynchronous-inverting converter, and asynchronous-boost-asynchronous-inverting converter.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control apparatus for a boost-inverting converter having a first switch connected between a first output and a first node, a second switch connected between a first input and the first node, an inductor connected between the first node and a second node to flow with an current therethrough, a third switch connected between the second node and a second input, a fourth switch connected between the second node and a second output, a first capacitor connected between the first output and second input, and a second capacitor connected between the second output and second input, the control apparatus comprising:
   a first error amplifier for producing a first signal by amplifying a first difference between a first reference signal and a first feedback signal derived from a first output voltage at the first output;
   a second error amplifier for producing a second signal by amplifying a second difference between a second reference signal and a second feedback signal derived from a second output voltage at the second output;
   a combiner for producing a third signal by combining the first signal multiplied by a first parameter and the second signal multiplied by a second parameter;
   a waveform generator for producing a fourth signal;
   a first comparator for producing a first control signal by comparing the first signal with the fourth signal;
   a second comparator for producing a second control signal by comparing the second signal with the fourth signal;
   a third comparator for producing a third control signal by comparing the third signal with the fourth signal; and
   a logical circuit for switching the four switches based on the three control signals, wherein the first and second switches will not turn on simultaneously, and the third and fourth switches will not turn on simultaneously;
   whereby when the second and third switches turn on and the first and fourth switches turn off, the inductor is energized, and when the second and third switches turn off and the first and fourth switches turn on, the first capacitor is discharged to produce the first output voltage, and the second capacitor is charged to produce the second output voltage.

2. The control apparatus of claim 1, wherein the logical circuit signals the first and fourth switches to turn off when the current is lower than a threshold.

3. The control apparatus of claim 1, wherein the logical circuit comprises:
an OR gate for producing a fifth signal in response to the first and third control signals;
a NOR gate for producing a sixth signal in response to the second and third control signals;
a first non-overlap clock generator for producing a first drive signal and a second drive signal in response to the sixth signal to switch the first and second switches, respectively; and
a second non-overlap clock generator for producing a third drive signal and a fourth drive signal in response to the fifth signal to switch the third and fourth switches, respectively.

4. The control apparatus of claim 3, wherein the waveform generator produces the fourth signal based on the four drive signals.

5. The control apparatus of claim 4, wherein the fourth signal is reset once the fourth signal is greater than the first and second signals.

6. The control apparatus of claim 1, further comprising:
a first voltage divider for dividing the first output voltage to produce the first feedback signal; and
a second voltage divider for dividing the second output voltage to produce the second feedback signal.

7. The control apparatus of claim 1, wherein the fourth signal has a sawtooth waveform.

8. The control apparatus of claim 1, wherein the fourth signal has a triangular waveform.

9. The control apparatus of claim 1, wherein the first and second parameters have a sum equal to one.

10. A control apparatus for a boost-inverting converter having a diode connected between a first output and a first node, a first switch connected between a first input and the first node, an inductor connected between the first node and a second node to flow with an current therethrough, a second switch connected between the second node and a second input, a third switch connected between the second node and a second output, a first capacitor connected between the first output and second input, and a second capacitor connected between the second output and second input, the control apparatus comprising:
a first error amplifier for producing a first signal by amplifying a first difference between a first reference signal and a first feedback signal derived from a first output voltage at the first output;
a second error amplifier for producing a second signal by amplifying a second difference between a second reference signal and a second feedback signal derived from a second output voltage at the second output;
a combiner for producing a third signal by combining the first signal multiplied by a first parameter and the second signal multiplied by a second parameter;
a waveform generator for producing a fourth signal;
a first comparator for producing a first control signal by comparing the first signal with the fourth signal;
a second comparator for producing a second control signal by comparing the second signal with the fourth signal;
a third comparator for producing a third control signal by comparing the third signal with the fourth signal; and
a logical circuit for switching the three switches based on the three control signals, wherein the second and third switches will not turn on simultaneously;
whereby when the first and second switches turn on and the third switch turns off, the inductor is energized, and when the first and second switches turn off and the third switch turns on, the first capacitor is discharged to produce the first output voltage, and the second capacitor is charged to produce the second output voltage.

11. The control apparatus of claim 10, wherein the logical circuit signals the third switch to turn off when the current is lower than a threshold.

12. The control apparatus of claim 10, wherein the logical circuit comprises:
an OR gate for producing a fifth signal in response to the first and third control signals;
a NOR gate in response to the second and third control signals for producing a first drive signal to switch the first switch; and
a non-overlap clock generator for producing a second drive signal and a third drive signal in response to the fifth signal to switch the second and third switches, respectively.

13. The control apparatus of claim 12, wherein the waveform generator produces the fourth signal based on the three drive signals.

14. The control apparatus of claim 13, wherein the fourth signal is reset once the fourth signal is greater than the first and second signals.

15. The control apparatus of claim 10, further comprising:
a first voltage divider for dividing the first output voltage to produce the first feedback signal; and
a second voltage divider for dividing the second output voltage to produce the second feedback signal.

16. The control apparatus of claim 10, wherein the fourth signal has a sawtooth waveform.

17. The control apparatus of claim 10, wherein the fourth signal has a triangular waveform.

18. The control apparatus of claim 10, wherein the first and second parameters have a sum equal to one.

19. A control apparatus for a boost-inverting converter having a first switch connected between a first output and a first node, a second switch connected between a first input and the first node, an inductor connected between the first node and a second node to flow with an current therethrough, a third switch connected between the second node and a second input, a diode connected between the second node and a second output, a first capacitor connected between the first output and second input, and a second capacitor connected between the second output and second input, the control apparatus comprising:
a first error amplifier for producing a first signal by amplifying a first difference between a first reference signal and a first feedback signal derived from a first output voltage at the first output;
a second error amplifier for producing a second signal by amplifying a second difference between a second reference signal and a second feedback signal derived from a second output voltage at the second output;
a combiner for producing a third signal by combining the first signal multiplied by a first parameter and the second signal multiplied by a second parameter;
a waveform generator for producing a fourth signal;
a first comparator for producing a first control signal by comparing the first signal with the fourth signal;

a second comparator for producing a second control signal by comparing the second signal with the fourth signal;
a third comparator for producing a third control signal by comparing the third signal with the fourth signal; and
a logical circuit for switching the three switches based on the three control signals, wherein the first and second switches will not turn on simultaneously;
whereby when the second and third switches turn on and the first switch turn off, the inductor is energized, and when the second and third switches turn off and the first switch turn on, the first capacitor is discharged to produce the first output voltage, and the second capacitor is charged to produce the second output voltage.

20. The control apparatus of claim 19, wherein the logical circuit signals the first switch to turn off when the current is lower than a threshold.

21. The control apparatus of claim 19, wherein the logical circuit comprises:
a NOR gate for producing a fifth signal in response to the second and third control signals;
a non-overlap clock generator for producing a first drive signal and a second drive signal in response to the fifth signal to switch the first and second switches, respectively; and
an OR gate for producing a third drive signal in response to the first and third control signals to switch the third switch.

22. The control apparatus of claim 21, wherein the waveform generator produces the fourth signal based on the three drive signals.

23. The control apparatus of claim 22, wherein the fourth signal is reset once the fourth signal is greater than the first and second signals.

24. The control apparatus of claim 19, further comprising:
a first voltage divider for dividing the first output voltage to produce the first feedback signal; and
a second voltage divider for dividing the second output voltage to produce the second feedback signal.

25. The control apparatus of claim 19, wherein the fourth signal has a sawtooth waveform.

26. The control apparatus of claim 19, wherein the fourth signal has a triangular waveform.

27. The control apparatus of claim 19, wherein the first and second parameters have a sum equal to one.

28. A control apparatus for a boost-inverting converter having a first diode connected between a first output and a first node, a first switch connected between a first input and the first node, an inductor connected between the first node and a second node to flow with an current therethrough, a second switch connected between the second node and a second input, a second diode connected between the second node and a second output, a first capacitor connected between the first output and second input, and a second capacitor connected between the second output and second input, the control apparatus comprising:
a first error amplifier for producing a first signal by amplifying a first difference between a first reference signal and a first feedback signal derived from a first output voltage at the first output;
a second error amplifier for producing a second signal by amplifying a second difference between a second reference signal and a second feedback signal derived from a second output voltage at the second output;
a combiner for producing a third signal by combining the first signal multiplied by a first parameter and the second signal multiplied by a second parameter;

a waveform generator for producing a fourth signal;
a first comparator for producing a first control signal by comparing the first signal with the fourth signal;
a second comparator for producing a second control signal by comparing the second signal with the fourth signal;
a third comparator for producing a third control signal by comparing the third signal with the fourth signal; and
a logical circuit for switching the two switches based on the three control signals;
whereby when the first and second switches turn on, the inductor is energized, and when the first and second switches turn off, the first capacitor is discharged to produce the first output voltage, and the second capacitor is charged to produce the second output voltage.

29. The control apparatus of claim 28, wherein the logical circuit comprises:
a NOR gate in response to the second and third control signals for producing a first drive signal to switch the first switch; and
an OR gate for producing a second drive signal in response to the first and third control signals to switch the second switch.

30. The control apparatus of claim 29, wherein the waveform generator produces the fourth signal based on the two drive signals.

31. The control apparatus of claim 30, wherein the fourth signal is reset once the fourth signal is greater than the first and second signals.

32. The control apparatus of claim 28, further comprising:
a first voltage divider for dividing the first output voltage to produce the first feedback signal; and
a second voltage divider for dividing the second output voltage to produce the second feedback signal.

33. The control apparatus of claim 28, wherein the fourth signal has a sawtooth waveform.

34. The control apparatus of claim 28, wherein the fourth signal has a triangular waveform.

35. The control apparatus of claim 28, wherein the first and second parameters have a sum equal to one.

36. A control method for a boost-inverting converter having a first switch connected between a first output and a first node, a second switch connected between a first input and the first node, an inductor connected between the first node and a second node to flow with an current therethrough, a third switch connected between the second node and a second input, a fourth switch connected between the second node and a second output, a first capacitor connected between the first output and second input, and a second capacitor connected between the second output and second input, the control method comprising steps of:
producing a first signal by amplifying a first difference between a first reference signal and a first feedback signal derived from a first output voltage at the first output;
producing a second signal by amplifying a second difference between a second reference signal and a second feedback signal derived from a second output voltage at the second output;
producing a third signal by combining the first signal multiplied by a first parameter and the second signal multiplied by a second parameter;
providing a fourth signal;
producing a first control signal by comparing the first signal with the fourth signal;
producing a second control signal by comparing the second signal with the fourth signal;

producing a third control signal by comparing the third signal with the fourth signal; and switching the four switches based on the three control signals, wherein the first and second switches will not turn on simultaneously, and the third and fourth switches will not turn on simultaneously;

whereby when the second and third switches turn on and the first and fourth switches turn off, the inductor is energized, and when the second and third switches turn off and the first and fourth switches turn on, the first capacitor is discharged to produce the first output voltage, and the second capacitor is charged to produce the second output voltage.

37. The control method of claim 36, further comprising a step of limiting the maximum duty cycle of the four switches.

38. The control method of claim 36, further comprising a step of turning off the first and fourth switches when the current is lower than a threshold.

39. The control method of claim 36, wherein the step of switching the four switches based on the three control signals comprises steps of:

producing a first drive signal and a second drive signal in response to the second and third control signals to switch the first and second switches, respectively; and producing a third drive signal and a fourth drive signal in response to the first and third control signals to switch the third and fourth switches, respectively.

40. The control method of claim 39, wherein the step of providing a fourth signal comprises a step of producing the fourth signal based on the four drive signals.

41. The control method of claim 40, further comprising a step of resetting the fourth signal once the fourth signal is greater than the first and second signals.

42. The control method of claim 36, wherein the step of providing the fourth signal comprises a step of producing a signal having a sawtooth waveform as the fourth signal.

43. The control method of claim 36, wherein the step of providing the fourth signal comprises a step of producing a signal having a triangular waveform as the fourth signal.

44. The control method of claim 36, wherein the first and second parameters have a sum equal to one.

45. A control method for a boost-inverting converter having a diode connected between a first output and a first node, a first switch connected between a first input and the first node, an inductor connected between the first node and a second node to flow with an current therethrough, a second switch connected between the second node and a second input, a third switch connected between the second node and a second output, a first capacitor connected between the first output and second input, and a second capacitor connected between the second output and second input, the control method comprising steps of:

producing a first signal by amplifying a first difference between a first reference signal and a first feedback signal derived from a first output voltage at the first output;

producing a second signal by amplifying a second difference between a second reference signal and a second feedback signal derived from a second output voltage at the second output;

producing a third signal by combining the first signal multiplied by a first parameter and the second signal multiplied by a second parameter;

providing a fourth signal;

producing a first control signal by comparing the first signal with the fourth signal;

producing a second control signal by comparing the second signal with the fourth signal;

producing a third control signal by comparing the third signal with the fourth signal; and switching the three switches based on the three control signals, wherein the second and third switches will not turn on simultaneously;

whereby when the first and second switches turn on and the third switch turns off, the inductor is energized, and when the first and second switches turn off and the third switch turns on, the first capacitor is discharged to produce the first output voltage, and the second capacitor is charged to produce the second output voltage.

46. The control method of claim 45, further comprising a step of limiting the maximum duty cycle of the four switches.

47. The control method of claim 45, further comprising a step of turning off the third switch when the current is lower than a threshold.

48. The control method of claim 45, wherein the step of switching the three switches based on the three control signals comprises steps of:

producing a first drive signal in response to the second and third control signals to switch the first switch; and producing a second drive signal and a third drive signal in response to the first and third signals to switch the second and third switches, respectively.

49. The control method of claim 48, wherein the step of providing a fourth signal comprises a step of producing the fourth signal based on the three drive signals.

50. The control method of claim 49, further comprising a step of resetting the fourth signal once the fourth signal is greater than the first and second signals.

51. The control method of claim 45, wherein the step of providing the fourth signal comprises a step of producing a signal having a sawtooth waveform as the fourth signal.

52. The control method of claim 45, wherein the step of providing the fourth signal comprises a step of producing a signal having a triangular waveform as the fourth signal.

53. The control method of claim 45, wherein the first and second parameters have a sum equal to one.

54. A control method for a boost-inverting converter having a first switch connected between a first output and a first node, a second switch connected between a first input and the first node, an inductor connected between the first node and a second node to flow with an current therethrough, a third switch connected between the second node and a second input, a diode connected between the second node and a second output, a first capacitor connected between the first output and second input, and a second capacitor connected between the second output and second input, the control method comprising steps of:

producing a first signal by amplifying a first difference between a first reference signal and a first feedback signal derived from a first output voltage at the first output;

producing a second signal by amplifying a second difference between a second reference signal and a second feedback signal derived from a second output voltage at the second output;

producing a third signal by combining the first signal multiplied by a first parameter and the second signal multiplied by a second parameter;

providing a fourth signal;

producing a first control signal by comparing the first signal with the fourth signal;

producing a second control signal by comparing the second signal with the fourth signal;

producing a third control signal by comparing the third signal with the fourth signal; and switching the three switches based on the three control signals, wherein the first and second switches will not turn on simultaneously;

whereby when the second and third switches turn on and the first switch turn off, the inductor is energized, and when the second and third switches turn off and the first switch turn on, the first capacitor is discharged to produce the first output voltage, and the second capacitor is charged to produce the second output voltage.

55. The control method of claim 54, further comprising a step of limiting the maximum duty cycle of the three switches.

56. The control method of claim 54, further comprising a step of turning off the first switch when the current is lower than a threshold.

57. The control method of claim 54, wherein the step of switching the three switches based on the three control signals comprises steps of:

producing a first drive signal and a second drive signal in response to the second and third control signals to switch the first and second switches, respectively; and producing a third drive signal in response to the first and third control signals to switch the third switch.

58. The method of claim 57, wherein the step of providing a fourth signal comprises a step of producing the fourth signal based on the three drive signals.

59. The method of claim 58, further comprising a step of resetting the fourth signal once the fourth signal is greater than the first and second signals.

60. The method of claim 54, wherein the step of providing the fourth signal comprises a step of producing a signal having a sawtooth waveform as the fourth signal.

61. The method of claim 54, wherein the step of providing the fourth signal comprises a step of producing a signal having a triangular waveform as the fourth signal.

62. The method of claim 54, wherein the first and second parameters have a sum equal to one.

63. A control method for a boost-inverting converter having a first diode connected between a first output and a first node, a first switch connected between a first input and the first node, an inductor connected between the first node and a second node to flow with an current therethrough, a second switch connected between the second node and a second input, a second diode connected between the second node and a second output, a first capacitor connected between the first output and second input, and a second capacitor connected between the second output and second input, the control method comprising steps of:

producing a first signal by amplifying a first difference between a first reference signal and a first feedback signal derived from a first output voltage at the first output;

producing a second signal by amplifying a second difference between a second reference signal and a second feedback signal derived from a second output voltage at the second output;

producing a third signal by combining the first signal multiplied by a first parameter and the second signal multiplied by a second parameter;

providing a fourth signal;

producing a first control signal by comparing the first signal with the fourth signal;

producing a second control signal by comparing the second signal with the fourth signal;

producing a third control signal by comparing the third signal with the fourth signal; and switching the two switches based on the three control signals;

whereby when the first and second switches turn on, the inductor is energized, and when the first and second switches turn off, the first capacitor is discharged to produce the first output voltage, and the second capacitor is charged to produce the second output voltage.

64. The method of claim 63, further comprising a step of limiting the maximum duty cycle of the two switches.

65. The control method of claim 63, wherein the step of switching the two switches based on the three control signals comprises steps of:

producing a first drive signal in response to the second and third control signals to switch the first switch; and producing a second drive signal in response to the first and third control signals to switch the second switch.

66. The method of claim 65, wherein the step of providing a fourth signal comprises a step of producing the fourth signal based on the two drive signals.

67. The control method of claim 66, further comprising a step of resetting the fourth signal once the fourth signal is greater than the first and second signals.

68. The control method of claim 63, wherein the step of providing the fourth signal comprises a step of producing a signal having a sawtooth waveform as the fourth signal.

69. The control method of claim 63, wherein the step of providing the fourth signal comprises a step of producing a signal having a triangular waveform as the fourth signal.

70. The control method of claim 63, wherein the first and second parameters have a sum equal to one.

* * * * *